United States Patent
Griffin

(10) Patent No.: US 12,548,329 B2
(45) Date of Patent: Feb. 10, 2026

(54) RELATIONSHIP MODELING AND ADJUSTMENT BASED ON VIDEO DATA

(71) Applicant: Insight Direct USA, Inc., Tempe, AZ (US)

(72) Inventor: Michael Griffin, Wayland, MA (US)

(73) Assignee: Insight Direct USA, Inc., Chandler, AZ (US)

(*) Notice: Subject to any disclaimer, the term of this patent is extended or adjusted under 35 U.S.C. 154(b) by 588 days.

(21) Appl. No.: 17/952,004

(22) Filed: Sep. 23, 2022

(65) Prior Publication Data

US 2023/0177799 A1   Jun. 8, 2023

Related U.S. Application Data

(60) Provisional application No. 63/405,722, filed on Sep. 12, 2022, provisional application No. 63/405,721, (Continued)

(51) Int. Cl.
*G06V 20/40* (2022.01)
*G06F 18/22* (2023.01)
(Continued)

(52) U.S. Cl.
CPC ............ *G06V 20/41* (2022.01); *G06F 18/22* (2023.01); *G06F 40/30* (2020.01); *G06V 10/426* (2022.01); *G06V 10/44* (2022.01); *G06V 10/70* (2022.01); *G06V 10/761* (2022.01); *G06V 10/774* (2022.01); *G06V 10/7753* (2022.01); *G06V 10/86* (2022.01); *G06V 20/46* (2022.01); *G06V 20/70* (2022.01); *G06V 30/274* (2022.01); *G06V 40/20* (2022.01); *G10L 25/57* (2013.01)

(58) Field of Classification Search
CPC ...... G06V 20/41; G06V 10/426; G06V 10/44; G06V 10/70; G06V 10/761; G06V 10/774; G06V 10/7753; G06V 10/86; G06V 20/46; G06V 20/70; G06V 30/274; G06V 10/764; G06F 18/22; G06F 40/30
See application file for complete search history.

(56) References Cited

U.S. PATENT DOCUMENTS 8,533,134 B1    9/2013  Zhao et al.
9,710,544 B1 *  7/2017  Smith ................ G06F 16/36
(Continued)

*Primary Examiner* — Ayodeji O Ayotunde
(74) *Attorney, Agent, or Firm* — Kinney & Lange, P.A.

(57) ABSTRACT

A method includes acquiring digital video data that portrays an interacting event, identifying a plurality of features in the digital video data with a first computer-implemented machine learning model, analyzing the plurality of features to create a baseline relationship graph, determining a target relationship graph, generating one or more actions for increasing similarity between the baseline relationship graph and the target relationship graph, and outputting the one or more actions by a user interface. The one or more actions are generated using a simulator, a second computer-implemented machine learning model, and a plurality of actions. The second computer-implemented machine learning model is configured to relate actions of the plurality of actions to changes to relationship graphs, the simulator is configured to simulate changes to the baseline relationship graph using the second computer-implemented machine learning model and the plurality of actions.

17 Claims, 10 Drawing Sheets

Related U.S. Application Data filed on Sep. 12, 2022, provisional application No. 63/405,719, filed on Sep. 12, 2022, provisional application No. 63/405,716, filed on Sep. 12, 2022, provisional application No. 63/286,844, filed on Dec. 7, 2021.

(51) Int. Cl.

| | | |
|---|---|---|
| *G06F 40/30* | (2020.01) | |
| *G06V 10/426* | (2022.01) | |
| *G06V 10/44* | (2022.01) | |
| *G06V 10/70* | (2022.01) | |
| *G06V 10/74* | (2022.01) | |
| *G06V 10/774* | (2022.01) | |
| *G06V 10/86* | (2022.01) | |
| *G06V 20/70* | (2022.01) | |
| *G06V 30/262* | (2022.01) | |
| *G06V 40/20* | (2022.01) | |
| *G10L 25/57* | (2013.01) | |

(56) References Cited

U.S. PATENT DOCUMENTS

| | | |
|---|---|---|
| 2016/0125346 A1 | 5/2016 | Krantz et al. |
| 2019/0066136 A1 | 2/2019 | Kopikare |
| 2019/0251359 A1* | 8/2019 | Pranger ............... G06V 40/174 |
| 2020/0285700 A1 | 9/2020 | Narayanan et al. |
| 2020/0365188 A1 | 11/2020 | Brinkman et al. |
| 2021/0312919 A1* | 10/2021 | Sato .................... G06F 16/3329 |
| 2023/0186120 A1 | 6/2023 | Zhao et al. |
| 2024/0312252 A1* | 9/2024 | Qiu ....................... G06V 40/20 |

\* cited by examiner

RELATIONSHIP MODELING AND ADJUSTMENT BASED ON VIDEO DATA

CROSS-REFERENCE TO RELATED APPLICATION(S)

This application claims the benefit of U.S. Provisional Application No. 63/286,844 filed Dec. 7, 2021 for "MACHINE LEARNING METHOD TO QUANTIFY PRESENT STATE-OF-MIND AND PREDICT FUTURE STATE-OF-MIND OF ONE OR MORE INDIVIDUALS BASED ON VIDEO IMAGES OF THOSE INDIVIDUALS" by M. Griffin, H. Kotvis, K. Lumb, K. Poulson, and J. Miner, the disclosure of which is incorporated in its entirety by reference herein; of U.S. Provisional Application 63/405,716 filed Sep. 12, 2022 for "RELATIONSHIP MODELING AND EVALUATION BASED ON VIDEO DATA" by M. Griffin, the disclosure of which is incorporated in its entirety by reference herein; of U.S. Provisional Application 63/405,719 filed Sep. 12, 2022 for "RELATIONSHIP MODELING AND ANOMALY DETECTION BASED ON VIDEO DATA" by M. Griffin, the disclosure of which is incorporated in its entirety by reference herein; of U.S. Provisional Application 63/405,721 filed Sep. 12, 2022 for "RELATIONSHIP MODELING AND KEY FEATURE DETECTION BASED ON VIDEO DATA" by M. Griffin, the disclosure of which is incorporated in its entirety by reference herein; and of U.S. Provisional Application 63/405,722 filed Sep. 12, 2022 for "RELATIONSHIP MODELING AND ADJUSTMENT BASED ON VIDEO DATA" by M. Griffin, the disclosure of which is also incorporated in its entirety by reference herein.

BACKGROUND

The present disclosure relates to relationship evaluation and, more particularly, systems and methods for automatically evaluating relationships and providing recommendations for adjusting relationships using video data.

Individuals interact with others in social and professional contexts and can form relationships through those interactions. It can be difficult to evaluate the strength of the relationship between two or more individuals by observing the interactions between those individuals. Further, it is difficult to evaluate relationships among individuals in real-time, especially for individuals having impairments that decrease the ability of those individuals to interpret verbal and/or non-verbal information.

SUMMARY

An embodiment of a method according to the present disclosure includes acquiring digital video data that portrays an interacting event, identifying a plurality of features in the digital video data with a first computer-implemented machine learning model, and analyzing the plurality of features to create a baseline relationship graph. The interacting event comprises a plurality of baseline interactions between a plurality of individuals, each feature of the plurality of features corresponds to a baseline interaction of the plurality of baseline interactions, and each feature of the plurality of features is associated with at least one individual of the plurality of individuals. The baseline relationship graph comprises a plurality of nodes and a plurality of edges, each node of the plurality of nodes represents an individual of the plurality of individuals, and each edge of the plurality of edges extends between two nodes of the plurality of nodes, and the plurality of edges represents the plurality of baseline interactions. The method further comprises determining a target relationship graph, generating one or more actions for increasing similarity between the baseline relationship graph and the target relationship graph, and outputting the one or more actions by a user interface. The one or more actions are generated using a simulator, a second computer-implemented machine learning model, and a plurality of actions. The second computer-implemented machine learning model is configured to relate actions of the plurality of actions to changes to relationship graphs, the simulator is configured to simulate changes to the baseline relationship graph using the second computer-implemented machine learning model and the plurality of actions, and the one or more actions are performable by individuals of the plurality of individuals.

An embodiment of a system according to the present disclosure includes a camera device for acquiring digital video data, a processor, a user interface, and a memory. The memory is encoded with instructions that, when executed, cause the processor to acquire digital video data from the camera, identify a plurality of features in the digital video data with a first computer-implemented machine learning model, and analyze the plurality of features to create a baseline relationship graph. The digital video data portrays an interacting event, the interacting event comprises a plurality of baseline interactions between a plurality of individuals, each feature of the plurality of features corresponds to a baseline interaction of the plurality of interactions, and each feature of the plurality of features is associated with at least one individual of the plurality of individuals. The relationship graph comprises a plurality of nodes and a plurality of edges, each node of the plurality of nodes represents an individual of the plurality of individuals, and each edge of the plurality of edges extends between two nodes of the plurality of nodes, and the plurality of edges represents the plurality of baseline interactions. The memory is further encoded with instructions that, when executed, cause the processor to determine a target relationship graph, generate one or more actions for increasing similarity between the baseline relationship graph and the target relationship graph, and cause the user interface to output an indication of the one or more actions. The one or more actions are generated using a simulator, a second computer-implemented machine learning model, and a plurality of actions. The second computer-implemented machine learning model is configured to relate actions of the plurality of actions to changes to relationship graphs, the simulator is configured to simulate changes to the baseline relationship graph using the second computer-implemented machine learning model and the plurality of actions, and the one or more actions are performable by individuals of the plurality of individuals.

DETAILED DESCRIPTION

The present disclosure relates to systems and methods for creating node and edge graphs describing relationships among a group of individuals based on video footage of those individuals interacting. The present disclosure further relates to systems and methods for generating actions for improving relationships based on relationship graph information. The relationship graphs described herein describe relationships during a set of interactions of a group of individuals with significantly more granularity than existing methods. Due to the granularity with which the relationship graphs described herein describe interactions between individuals, the granularity allows for changes to relationships to be determined on an interaction-by-interaction basis and in an automated manner.

As will be explained in more detail, the present disclosure uses a relationship graph describing a baseline set of relationships among a group of individuals to predict a series of actions that can be performed to adjust those baseline relationships to a target set of relationships. The target relationships are associated with improved outcomes of interacting events of the type the individuals are participating in. Advantageously, this allows for the individuals of the group to improve their relationships and thereby improve outcomes of interacting events involving the group without requiring that the individuals themselves make subjective judgments about relationship improvement. The systems and methods described herein can be used and adapted for any interacting event or task, enabling the systems and methods described herein to be used to improve performance of a large variety of tasks and/or activities for a wide variety of groups.

Further, the present disclosure provides methods that can be performed using computer-implemented machine learning models to provide real-time relationship analysis and real-time prediction of actions for adjusting those relationships. Advantageously, this allows for the predicted actions for adjusting relationship to be performed shortly after or during the collection of video data used to make the action prediction.

Figure 1:
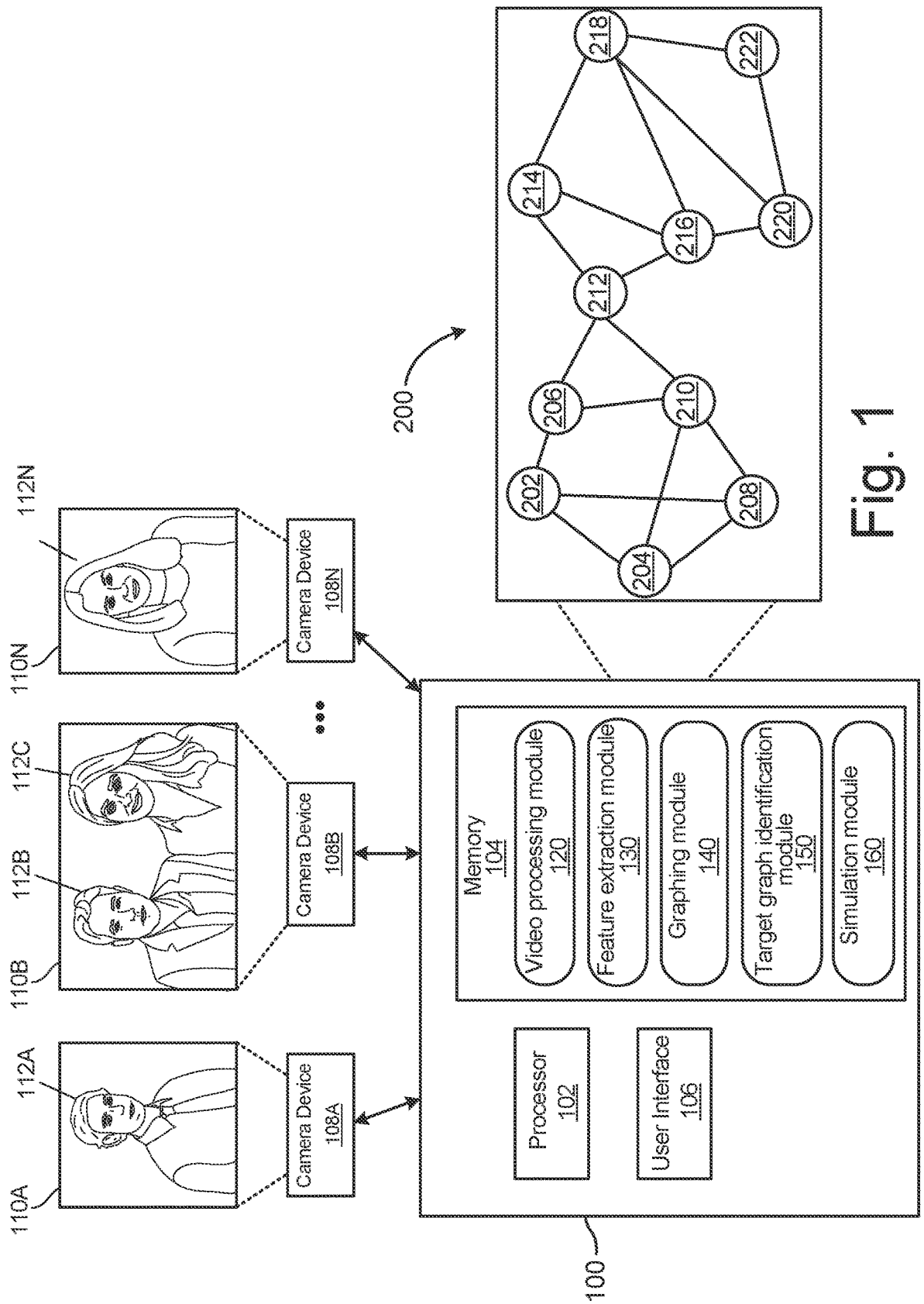
FIG. 1 is a schematic diagram of an example of a system for relationship evaluation.

FIG. 1 is a schematic diagram of relationship adjuster 100, which is a system for evaluating and adjusting the relationship of two or more individuals. Relationship adjuster 100 is configured to evaluate relationships by creating node and edge graphs representative of relationships among two or more individuals and creating actions that can be performed by those individuals to adjust the edges of those graphs. Relationship adjuster 100 is also configured to use a graph describing interactions among a group to determine actions for changing the relationships among the members of the group during subsequent interactions to increase the similarity between a graph describing those subsequent interactions and a target graph. Relationship adjuster 100 includes processor 102, memory 104, and user interface 106, and is connected to camera devices 108A-N. Camera devices 108A-N capture video data 110A-N of individuals 112A-N. Memory 104 includes video processing module 120, feature extraction module 130, graphing module 140, target graph module 150, and simulation module 160. Memory 104 also stores relationship graph 200, which is an edge and node graph created by graphing module 140. Relationship graph 200 includes nodes 202, 204, 206, 208, 210, 212, 214, 216, 218, 220, and 222. Each of nodes 202, 204, 206, 208, 210, 212, 214, 216, 218, 220, 222 are connected to another of nodes 202, 204, 206, 208, 210, 212, 214, 216, 218, 220, 222 by at least one edge.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on relationship adjuster 100 (e.g., by a computer-implemented machine learning model or a data processing module) to temporarily store information during program execution.

Memory 104, in some examples, also includes one or more computer-readable storage media. Memory 104 can be configured to store larger amounts of information than volatile memory. Memory 104 can further be configured for long-term storage of information. In some examples, memory 104 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and enables an operator to control operation of relationship adjuster 100. For example, user interface 106 can be configured to receive inputs from an operator and/or provide outputs. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Relationship adjuster 100 is configured to perform one or more methods described herein. Relationship adjuster 100 can accept data from and/or can be operably connected to an audiovisual data stream and/or an audiovisual data file. Relationship adjuster 100 can also use data from an audiovisual data stream and/or an audiovisual data file. More generally, relationship adjuster 100 is configured to perform any of the functions attributed herein to a relationship adjuster, including receiving an output from any source referenced herein, detecting any condition or event referenced herein, and generating and providing data and information as referenced herein.

Relationship adjuster 100 can be a discrete assembly or be formed by one or more devices capable of individually or collectively implementing functionalities and generating and outputting data as discussed herein. In some examples, relationship adjuster 100 can be implemented as a plurality of discrete circuitry subassemblies. In some examples, relationship adjuster 100 can include or be implemented at least in part as a smartphone or tablet, among other options. In some examples, relationship adjuster 100 and/or user interface 106 of relationship adjuster 100 can include and/or be implemented as downloadable software in the form of a mobile application. The mobile application can be implemented on a computing device, such as a personal computer, tablet, or smartphone, among other suitable devices. Relationship adjuster 100 can be considered to form a single computing device even when distributed across multiple component devices.

Camera devices 108A-N are capable of capturing video data 110A-N of one or more individuals 112A-N. In the depicted example, camera devices 108A and 108N are depicted as capturing video data 110A and 110N of single individuals 112A and 112N. Camera device 108B is depicted as capturing video data 110B of two individuals 112B and 112C. Each camera device 108A-N captures video data 110A-N of one or more individuals 112A-N. Each camera device 108A-N is configured to be able to communicate with relationship adjuster 100 and relationship adjuster 100 is configured to communicate with each camera device 108A-N. Camera devices 108A-N can be, for example, a video camera, a webcam, or another suitable source for obtaining video data 110A-N. Camera devices 108A-N can be controlled by relationship adjuster 100 or by another suitable video device. Video data 110A-N are audiovisual data feeds portraying individuals 112A-N. Video data 110A-N can be stored to memory 104 for use with one or more methods described herein or can be stored to another storage media and recalled to memory 104 for use with one or more methods described herein.

Although FIG. 1 depicts only three camera devices 108A-N, relationship adjuster 100 can be operatively connected to any number of camera devices 108A-N. Each additional camera device 108A-N can capture video data 110A-N portraying one or more additional individuals 112A-N. Similarly, although each of video data 110A-N is depicted as portraying a single individual 112A-N, in other examples each of video data 110A-N can depict two or more individuals 112A-N. In some examples, relationship adjuster 100 includes only one camera that captures video data of all individuals 112A-N.

Individuals 112A-N are participating in an interacting event. As used herein, an "interacting event" refers to an event where the individuals 112A-N interact with each other through one or more interactions. The interacting event can be, for example, a meeting, a presentation, a sales pitch, a negotiation, or a conference, among other options. Each interaction that occurs during the interacting event is associated with at least two people. For each interaction, one individual performs an action toward at least one other individual, where the actions are selected and/or intended to have an effect on the other individual(s). Each action can include, for example, one or more words, one or more gestures, and/or one or more audible noises, among other options. For example, an individual can orally speak a statement (e.g., one or more sentences expressing an idea, thought, and/or concept) and physically perform one or more gestures to complement the spoken words of the statement. The statement can be directed at one or more other individuals. In some examples, the statement and the gestures accompanying the statement can be treated as a single interaction. Additionally and/or alternatively, the statement and the gestures accompanying can be treated as separate interactions. Where a statement includes multiple sub-statements that are linguistically separable, each sub-statement can also be treated as a separate interaction.

Video processing module 120 includes one or more programs for processing video data 110A-N. For example, video processing module 120 can include one or more programs for extracting image data, audio data, and semantic text data from video data 110A-N. As used herein, "image data" refers to the portion of video data 110A-N that is a series of still images, "audio data" refers to the sound data stored in video data 110A-N, and "semantic text data" refers to data that represents spoken words, phrases, sentences, and other sounds produced by the individual as readable text.

Feature extraction module 130 includes one or more programs for classifying the image data, audio data, and semantic text data extracted by video processing module 120. Feature extraction module 130 can include one or more programs for extracting classifiable features from the image data, audio data, and/or semantic text data. In some examples, feature extraction module 130 can include one or more computer-implemented machine learning models for extracting classifiable features from the image data, audio data, and/or semantic text data. The features extracted by feature extraction module 130 describe interactions captured by camera devices 108A-N.

Graphing module 140 includes one or more programs for transforming features extracted by feature extraction module 130 into a relationship graph. Each relationship graph created by graphing module 140 includes a plurality of nodes and a plurality of edges. Each node of a relationship graph represents each of individuals 112A-N involved in a particular interacting event and each edge is representative of one or more features extracted by feature extraction module 130 from video data 110A-N of that interacting event. Graphing module 140 includes one or more programs for identifying individuals and creating nodes of a relationship graph. Similarly, graphing module 140 includes one or more programs for transforming features extracted by feature extraction module 130 into edges that connect the nodes of the relationship graph.

Processor 102 can use programs of graphing module 140 and information describing the identities of individuals 112A-N to create the nodes of the relationship graph. The identity information can be determined by, for example, analyzing data from video processing module 120 with one or more programs of feature extraction module 130 to identify features representative of identity. For example, graphing module 140 can also include one or more programs for identifying individuals 112A-N in video data 110A-N based on features extracted by feature extraction module 130. Graphing module 140 can further include one or more programs for associating features extracted by feature extraction module 130 with each of individuals 112A-N. An individual 112A-N can be identified by, for example, cross-referencing features with a table or array that relates features to identity. Additionally and/or alternatively, a machine learning model trained to identify an individual 112A-N based on a training set of features from image, audio, and/or semantic text data can be used to identify individuals 112A-N for creating nodes of the relationship graph. In examples where the individual 112A-N is identified, the nodes of the relationship graph can include, for example, descriptions of the name, title, or organizational position of the individual 112A-N, among other options. In other examples, descriptive identity information may not be available for one or more of individuals 112A-N. In these examples, the nodes of the relationship graph can include descriptions of the physical appearance, setting, built environment, or geographic location of the individual 112A-N, among other options. Feature extraction module 130 and/or graphing module 140 can include one or more programs for determining physical and/or environmental descriptions for each individual 112A-N represented as a node of the relationship graph.

Graphing module 140 can include one or more programs for creating an edge from each feature extracted by feature extraction module 130. Each feature extracted by feature extraction module 130 can be associated with at least one individual of individuals 112A-N captured in video data 110A-N by cameras 108A-N, such that each edge of the relationship graph can be associated with at least one node of the relationship graph. Graphing module 140 can also include one or more programs that, for each edge, are able to associate the edge with the nodes representative of the individuals associated with the feature represented by the edge. For example, for a feature that describes a statement (e.g., a feature that describes words spoken in the statement), can be associated with the speaker and/or the recipients of the statement. Processor 102 can use one or more programs of graphing module 140 to create an edge for each recipient of the statement and to associate those edges with the speaker, such that for each recipient of the statement, processor 102 creates an edge extending from the speaker to the recipient. In some examples, the features extracted by feature extraction module 130 are associated with all individuals involved in the interaction. Feature extraction module 130 and/or graphing module 140 can include one or more programs to automatically determine the individual that initiated an interaction described by the feature and further to determine individuals that were the intended recipients of that interaction. As will be described in more detail subsequently, the edges created using the programs of graphing module 140 can be directed or undirected and can also be weighted or unweighted.

Processor 102 can use programs of graphing module 140 to create a relationship graph for an interacting event by organizing the node and edge data for the interacting event. The relationship graphs created by graphing module 140 represent the relationships of individuals 112A-N as captured in video data 110A-N of an interacting event. Advantageously, organizing feature data extracted by feature extraction module 130 into the node and edge relationship graphs created by the programs of graphing module 140 significantly improves the ease with which patterns and data relationships can be identified within an extracted feature set for a particular interacting event. The relationship graph created by graphing module 140 can be represented as a table, a database, or a graphical image, among other options. In some examples, all edges extending between two nodes are combined into a single, weighted edge in the relationship graph data. In other examples, each edge is stored separately in the relationship graph. In some of these examples, the relationship graph also stores descriptions of the features corresponding to each edge, allowing analysis for the presence and/or absence of particular interactions during the interacting event represented by the relationship graph.

Where the features used to create a relationship graph with the programs of graphing module 140 are derived from video data of a group of individuals, the resulting relationship graph is referred to herein as a "baseline relationship graph." Baseline relationship graphs describe relationships between individuals of a group as those relationships are captured in video data processed and used to create a relationship graph by the programs of video processing module 120, feature extraction module 130, and graphing module 140. Baseline relationship graphs can be contrasted from target relationship graphs, which represent a target set of relationships between individuals described by a baseline relationship graph, as discussed in more detail subsequently and particularly with respect to target graph module 150. As will also be discussed in more detail subsequently, and particularly with respect to simulation module 160, the baseline relationship graphs created by graphing module 140 and a target graph (i.e., a target graph identified by target graph module 150) can be used to create actions for adjusting the relationships of the group of individuals described by the baseline relationship graph to be more like the relationships depicted by the target relationship graph.

Target graph module 150 includes one or more programs for determining a target relationship graph for a group of individuals. The relationship graphs generated by target graph module 150 are representative of a target group of relationships between the group of individuals. The target relationships are associated with a positive or improved outcome of an event, such as improved performance of a task performed by the group during an event. For example, if the interacting event depicted in video data processed and used to create a baseline relationship graph is a meeting, the target relationships can be selected to improve the outcome of the meeting. For example, the target relationships can be selected to improve the efficiency of the meeting or to improve the performance of a task performed by the group during the meeting, such as a presentation, a collaborative creative task, or another suitable task that can be performed during a meeting. The target relationship graph for a given group of individuals generally has the same number of nodes as the baseline graph generated for the group of individuals, such that recommendations for changing the group's relationship do not involve recommendations to include or remove members of the group. Rather, as compared to the baseline relationship graph, the target relationship graph includes a different, target set of edges extending between those nodes that represent a target set of interactions associated with an improved outcome of an interacting event involving the group.

The target relationship graph can be selected from a pre-determined set of potential target relationship graphs based on a property of an interacting event in which the group is participating, such as a task performed during the interacting event or a category of event to which the interacting event belongs, among other options. The target relationship graph can also be selected based on a property of one or more of the individuals of the group, such as the identity or positions of the individuals, among other options. Processor 102 can use one or more programs of target graph module 150 to identify and select a target graph from a set of graphs stored to memory 104. In other examples, a new target relationship graph can be generated based on the number of individuals interacting, the identity of the individuals, and one or more programs for generating edges between nodes representative of the individuals based on the identities of the individuals, the relative position of the individuals, the type of event portrayed by a baseline relationship graph of the individuals, and/or a task performed by the individuals during the event described by the baseline relationship graph.

Simulation module 160 includes one or more programs for simulating the effect of actions on baseline graphs created by graphing module 140. Simulation module 160 uses a simulator to simulate a set of changes to the relationships of a baseline graph that increases the similarity between the baseline graph and a target relationship graph. Simulation module 160 also includes one or more programs that relate changes to relationships and performable actions. The one or more programs can be, for example, one or more computer-implemented machine learning models that are trained to relate performable actions with changes to relationship graphs. The simulator can use the program(s) for relating the performable actions to changes to relationship graphs to simulate a set of actions that increase the similarity between the baseline relationship graph and the target relationship graph. When performed, the actions that increase the similarity between the baseline and target relationship graphs cause the relationship graph of a subsequent event to have a higher similarity to the target relationship graph than the baseline relationship graph has to the target relationship graph. As the target relationship graph represents a target set of relationships for the group and the baseline relationship graph represents a baseline set of relationships, the actions are also associated with causing the baseline relationships of the group to become more similar to the target set of relationships.

Relationship adjuster 100 can simulate a set of actions for increasing similarity between baseline and target relationship graphs by simulating a plurality of changes to a baseline graph with the program(s) for relating the performable actions to changes to relationship graphs. More specifically, relationship adjuster predicts changes to the baseline edges of the baseline graph to create a relationship graph having edges with a high degree of similarity (e.g., in arrangement and/or strength) to the target edges of the target relationship graph. Each change can be the predicted result of the performance of a single action or a group of actions. Another program or programs of simulation module 160 can evaluate the similarity between the graphs and the target relationship graph to determine which action or group of actions produced the greatest increase in similarity between the baseline and target relationship graphs. The relationship graph having the highest similarity to the target relationship graph can be stored as an intermediate graph to memory 104 and used as the starting graph for a subsequent simulation iteration. The simulation process can be repeated until the baseline relationship graph is sufficiently similar to the target relationship graph. The similarity threshold can be predetermined and similarity between the most-recent intermediate relationship graph. When relationship adjuster 100 simulates an intermediate graph within the similarity threshold to the target relationship graph, relationship adjuster 100 can output an indication of the actions used to create that intermediate graph via user interface 106. The indication can be, for example, one or more alphanumeric characters and/or one or more audio segments describing the actions. The indication can also be, for example, instructions for performing the actions output as alphanumeric characters and/or audio segments. Memory 104 can store a table, array, and/or database that associates actions output by the programs of simulation module 160 with indications of those actions and/or indications of instructions for performing those actions.

Memory 104 can also include one or more programs for recognizing an interacting event. Each relationship graph generated by graphing module 140 describes one interacting event. However, in some examples video data 110A-N can include footage of more than one interacting event (e.g., footage of two consecutive interacting events). Memory 104 can include one or more programs for recognizing interacting events in a continuous video recording of multiple interacting events and for isolating the video data for each event. The video data for each event can then be processed using video processing module 120, feature extraction module 130, graphing module 140, target graph module 150, and simulation module 160.

Relationship graph 200 is one example of a relationship graph. Relationship graph 200 can be a baseline relationship graph created by graphing module 140 and/or target graph module 150 for use with simulation module 160, and can be stored to memory 104. Relationship graph 200 includes nodes 202-222, which are connected by various edges. Node 202 is connected to nodes 204, 206, and 208. Node 204 is connected to nodes 202, 208, and 210. Node 206 is connected to nodes 202, 210, and 212. Node 208 is connected to nodes 202, 204, and 210. Node 210 is connected to nodes 204 and 206. Node 212 is connected to nodes 206, 210, 214, and 216. Node 214 is connected to nodes 212, 216, and 218. Node 216 is connected to nodes 212, 214, 218, and 220. Node 218 is connected to nodes 214, 216, 220, and 222. Node 220 is connected to nodes 216, 218, and 222. Node 222 is connected to nodes 218 and 220. Relationship graph 200 is a visual, plotted depiction of relationship graph information. The information depicted in relationship graph 200 can be stored in other manners (e.g., as a table, array, or database). The plotted depictions of relationship graphs herein are not limiting and are included for explanatory purposes.

The nodes of relationship graph 200 are arranged into two sub-groups. Specifically, nodes 202-210 form one subgroup that is linked to a second subgroup of nodes 214-222 by node 212. If, for example, relationship graph 200 described a meeting of workers in a hierarchically-arranged office environment, the arrangement of workers within the office hierarchy can be inferred from the from the distribution of nodes 202-222 and the edges interconnecting nodes 202-222. For example, it can be inferred that the individuals represented by nodes 206, 210, 216, and 214 are in a middle-management role between the individual represented by node 212, who likely has elevated managerial and/or decision-making duties, and the individuals represented by nodes 202, 204, 207, 218, 220, and 222, who likely are low-level workers with few or no managerial responsibilities.

Further, one of the individuals represented by nodes 200-222 or an individual interacting with the individuals represented by nodes 200-222 can inspect relationship graph 200 to understand the relationship dynamics among the group of individuals represented by nodes 200-222. For example, if a salesperson is making a sales pitch to the individuals represented by nodes 200-222, the salesperson could inspect relationship graph 200 to identify the individual represented by node 212 as an individual with decision-making authority, and the salesperson could tailor their sales pitch toward the individual represented by node 212. As a further example, relationship graph 200 could be used by the individuals represented by nodes 200-212 to understand the effectiveness of their organizational hierarchy or management structure. As described with respect to the previous example, the structure of relationship graph 200 implies that the individual represented by node 212 has the highest position in an organizational hierarchy among the individuals represented by nodes 200-222. If, however, the individual represented by node 222 is designated as having highest position in the organizational hierarchy, the structure of relationship graph 200 implies that, despite their designation, the individual represented by node 222 is not who the other individuals represented by nodes 200-220 look to for leadership and/or management. In this example, the structure of relationship graph implies one or more defects in the organizational structure and/or in the managerial capabilities of the individual represented by node 222.

In some examples, nodes 200-222 can be labeled according to the role of the individual represented by the node in an organizational hierarchy, and the labels can be used also be used by target graph module 150 to determine a target relationship graph for a group of individuals and/or by simulation module 160 to compare a simulated intermediate graph to a target relationship graph. For example, if node 212 is labeled as the highest-ranking role and node 222 is labeled as the lowest-ranking role in an organizational hierarchy, it may be advantageous for outcomes of events involving the group represented by nodes 200-222 for there to be few or no edges extending between nodes 212 and 222.

Relationship graph 200, including nodes 200-222 and the depicted arrangement of nodes 200-222, is a non-limiting example and is provided for explanatory purposes. In other examples, relationship graph 200 could have a different quantity of nodes and/or the nodes of relationship graph could have a different arrangement (i.e., by having a different set of edges). Similarly, the programs stored on memory 104 (e.g., those of video processing module 120, feature extraction module 130, graphing module 140, target graph module 150, or simulation module 160) can be used to create and evaluate other relationship graphs.

FIGS. 2-5 are schematic depictions of other examples of plotted relationship graphs that can be produced using graphing module 140 and/or target graph module 150. Like relationship graph 200, the relationship graphs depicted in FIGS. 2-5 are shown as plotted graphs. Each of FIGS. 2-5 depicts the same four individuals as nodes 272,274,276,278. However, each of FIGS. 2-5 depicts an alternative arrangement and/or type of edges describing the interactions of an interacting event between the individuals represented by nodes 272-278.

Figure 2:
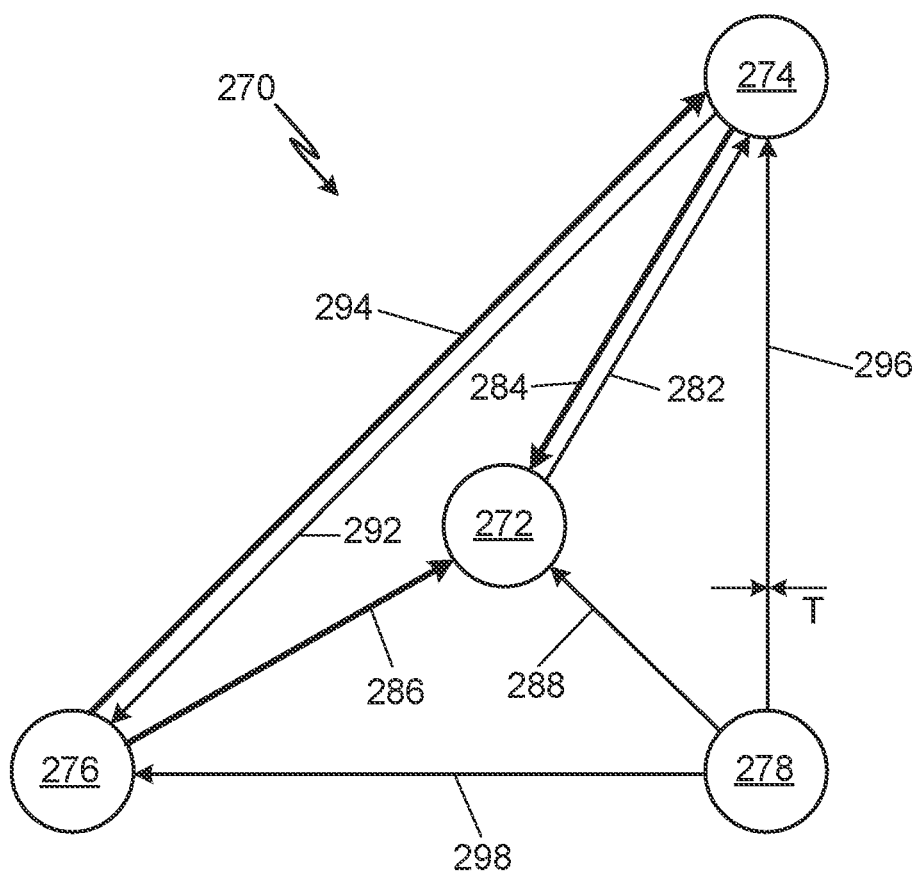
FIG. 2 is a schematic diagram of an example of a relationship graph that can be created by the system of FIG. 1.

FIG. 2 is a schematic depiction of relationship graph 270, which includes nodes 272-278 and edges 282-298. Relationship graph 270 is a weighted, directed graph, such that each of edges 282-298 has a direction (indicated by an arrowhead) and a weight. In FIG. 2, each of edges 282-298 has a thickness T that is representative of the weight of the edge. Each of nodes 272,274,276,278 are connected to each other of nodes 272,274,276,278 by at least one of edges 282-298. Edge 282 extends from node 272 to node 274, edge 284 extends from node 274 to node 272, edge 286 extends from node 276 to node 274, edge 288 extends from node 278 to node 272, edge 292 extends from node 274 to node 276, edge 294 extends from node 276 to node 274, edge 296 extends from node 278 to node 274, and edge 298 extends from node 278 to node 276. The orientation of edges 282-298 can convey the direction of interactions between the individuals represented by nodes 272-278, among other options. For example, edge 282 can represent interactions initiated by the individual represented by node 272 and directed toward the individual represented by node 274. Similarly, edge 284 can represent interactions initiated by the individual represented by node 274 and directed toward the individual represented by node 272. As is indicated by the relative thicknesses of edges 282 and 284 (indicative of the weight of edges 282 and 284), the individual represented by node 274 initiated significantly more interactions that were directed toward the individual represented by node 272 than the individual represented by node 272 initiated in the reverse direction (i.e., toward the individual represented by node 274). Further, as is indicated by the direction of edges 292,294, and 296, the individual represented by node 274 did not initiate interactions with the individual represented by node 278 but did initiate interactions with the individual represented by node 276. The weights of edges 292 and 284 indicate that the individual represented by node 274 initiated significantly more interactions with the individual represented by node 272 than the individual represented by node 276. Whether an individual is an initiator and/or recipient of an interaction can be determined based on the features extracted by feature extraction module 130. Other aspects of the relationships of the individuals represented by nodes 272-278 not discussed herein can be determined based on the orientations and weights of edges 282-298.

Figure 3:
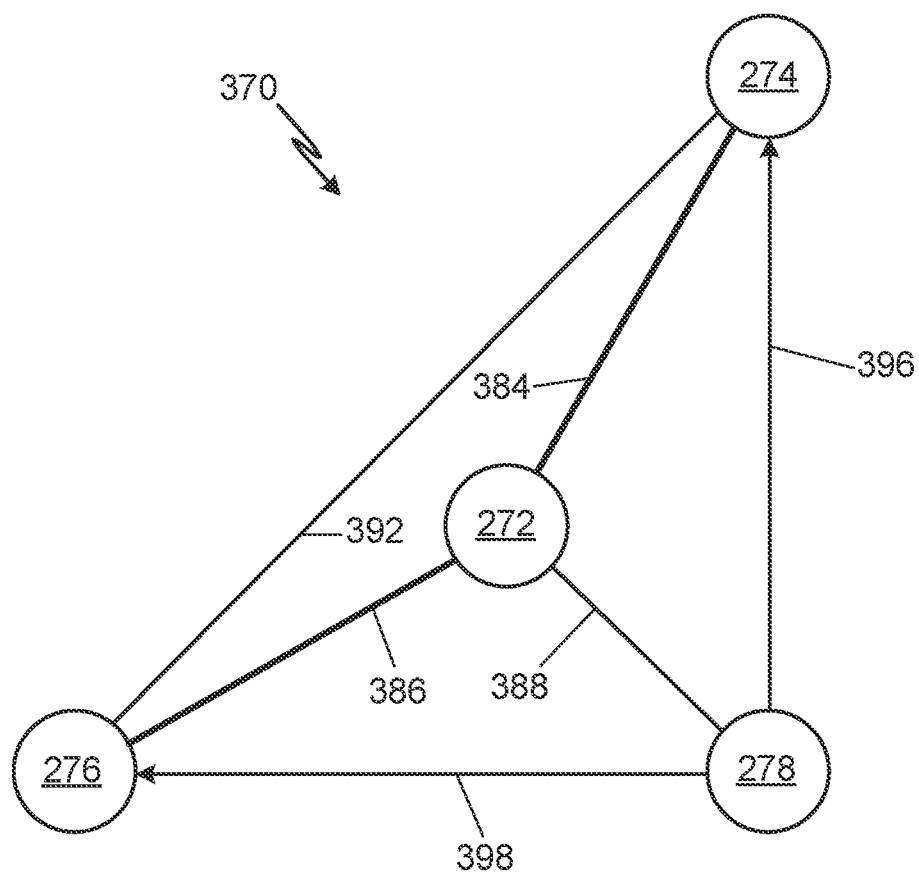
FIG. 3 is a schematic diagram of another example of a relationship graph that can be created by the system of FIG. 1.

FIG. 3 is a schematic depiction of relationship graph 370, which is another example of a relationship graph that can be produced using graphing module 140. Relationship graph 370 includes nodes 272-278 connected by edges 384-398. Relationship graph 370 is a weighted and undirected graph, such that each of edges 384-398 has a weight, but unlike edges 282-298, edges 384-398 do not have directions or orientations. Like edges 282-298 (FIG. 2), each of edges 384-398 has a thickness that is representative of the weight of the edge. In FIG. 3, each of nodes 272, 274, 276, 278 are connected to each other of nodes 272, 274, 276, 278 by at least one of edges 384-398. Edge 384 extends between nodes 272 and 274, edge 386 extends between nodes 272 and 276, edge 388 extends between node 272 and node 278, edge 392 extends between nodes 274 and 276, edge 396 extends between nodes 274 and 278, and edge 398 extends between nodes 276 and 278. As edges 384-398 are unweighted, relationship graph 370 does not store information related to which individual(s) of those represented by nodes 272-278 initiated interactions and/or which individual (s) were the intended recipients of those interactions. Unweighted edges can be advantageous to describe interactions that do not have a clear initiator and/or recipient. For example, if two individuals make incidental eye contact during an interacting event, the eye contact may be a useful interaction for describing the relationship among those members of the group, but it may be difficult to discern who initiated the incidental eye contact. Relationship graph 370 condenses the quantity and/or quality of interactions between each individual into a single, weighted edge. Accordingly, relationship graph 370 conveys the overall strength of connection between the individuals represented by nodes 272-278. For the depicted example, the connection between the individuals represented by nodes 272 and 274 and the connection between the individuals represented by nodes 272 and 276 are stronger than the connections between other combinations of individuals.

Figure 4:
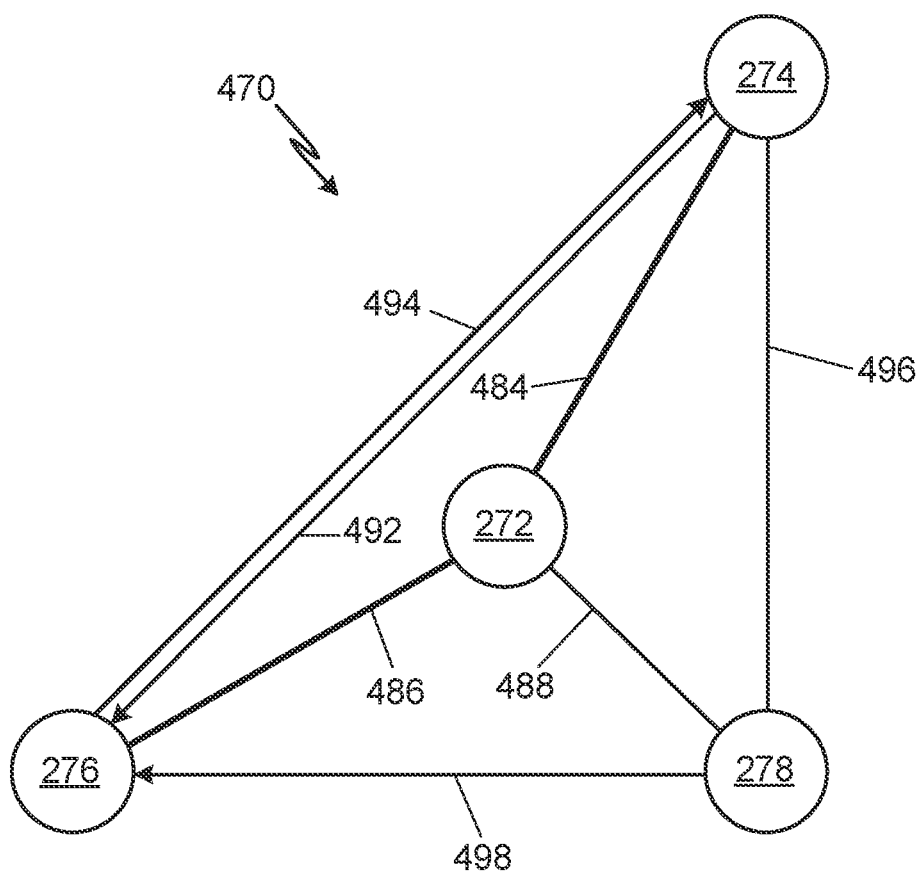
FIG. 4 is a schematic diagram of a further example of a relationship graph that can be created by the system of FIG. 1.

FIG. 4 is a schematic depiction of relationship graph 470, which a further example of a relationship graph that can be produced using graphing module 140. Relationship graph 470 includes nodes 272-278 connected by edges 484-498. Relationship graph 470 is a weighted graph, such that each of edges 384-398 has a weight. Unlike relationship graphs 270 and 370 (FIGS. 2-3), however, relationship graph 470 includes a mixture of undirected and directed edges. Relationship graph 470, accordingly, is able to store information relating to features extracted from interactions that have a discernable initiator and/or recipient and interactions that do not have a clear initiator and/or recipient. In FIG. 4, each of nodes 272, 274, 276, 278 are connected to each other of nodes 272, 274, 276, 278 by at least one of edges 484-498. Edge 484 is undirected and extends between nodes 272 and 274, edge 486 is directed and extends from node 276 to node 278, edge 488 is undirected and extends between nodes 272 and 278, edge 492 is directed and extends from node 274 to node 276, edge 494 is directed extends from node 276 to node 274, edge 496 is undirected and extends between nodes 274 and 278, and edge 498 is directed and extends from node 278 to node 276. Edges 486, 492, and 494 are directed and, accordingly, store initiator and/or recipient information. Edges 484, 488, and 496 are unweighted and do not store initiator and/or recipient information.

The edges of the plotted depictions of relationship graphs 270, 370, and 470 in FIGS. 2-4 are weighted and can represent a combination of multiple interactions. Using relationship graph 470 (FIG. 4) as an example, edge 486 may represent a single, weighted value reflective of all interactions initiated by the individual represented by node 276 and directed to the individual represented by node 272. Combining edges allows each edge to be representative the overall connection between the individuals represented by the nodes connected by the edge. No more than two directed edges or one undirected edge extends between any pair of nodes 272-278 in relationship graphs 270, 370, and 470 (FIGS. 2-4, respectively). In other examples, it may be advantageous to combine interactions into multiple groups of interactions (e.g., by type of category of interaction) and/or to not combine some or all interactions, such that the relationship graph is a multigraph and multiple edges extend between certain pairs of nodes 272-278.

Figure 5:
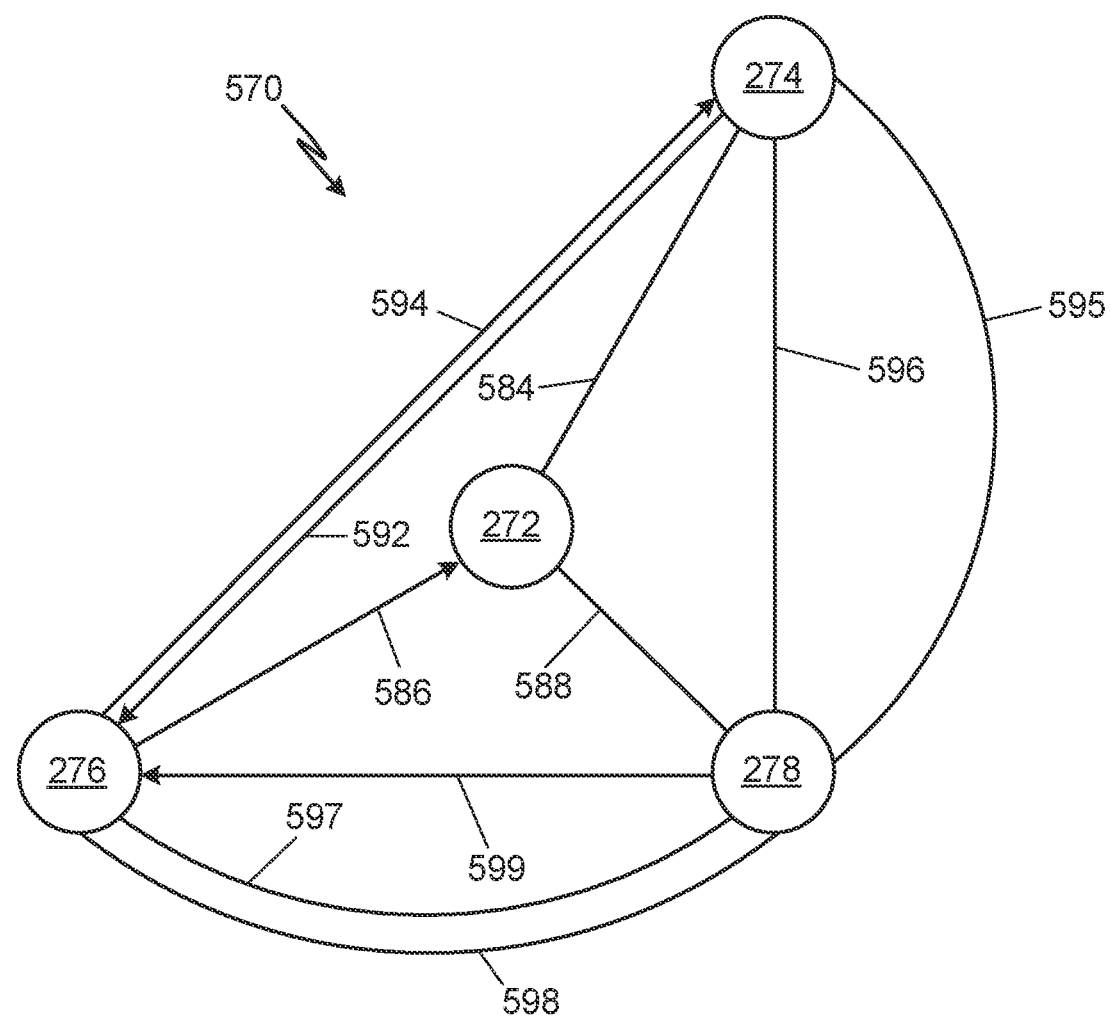
FIG. 5 is a schematic diagram of a further example of a relationship graph that can be created by the system of FIG. 1.

FIG. 5 is a schematic depiction of relationship graph 570, which is a further example of a relationship graph of an interacting event. Relationship graph 570 includes nodes 272-278 connected by edges 584-599. Relationship graph 570 is a multigraph, such that multiple edges extend between certain pairs of nodes 272-278. Accordingly, different edges extending between the same pair of nodes 272-278 can correspond to different interactions and/or different groups of interactions. Like relationship graph 470 (FIG. 4), relationship graph 570 includes a mixture of undirected and directed edges. Relationship graph 570, accordingly, is able to store information relating to features from interactions that have a discernable initiator and/or recipient and interactions that do not have a clear initiator and/or recipient. For clarity and explanatory purposes, relationship graph 570 is not depicted as a weighted graph, but in other examples a relationship graph created by graphing module 140 can be a multigraph that includes weighted edges. Similarly, while relationship graph 570 is a multigraph that includes a combination of directed and undirected edges, graphing module 140 can also be configured to create multigraphs including only directed edges as well as multigraphs including only undirected edges.

In FIG. 5, each of nodes 272, 274, 276, 278 are connected to each other of nodes 272, 274, 276, 278 by at least one of edges 584-599. Edge 584 is undirected and extends between nodes 272 and 274, edge 586 is directed and extends from node 276 to node 272, edge 588 is undirected and extends between nodes 272 and 278, edge 592 is directed and extends from node 274 to node 276, edge 594 is directed and extends from node 276 to node 274, edges 595 and 596 are undirected and extend between nodes 274 and 278, edges 597 and 598 are undirected and extend between nodes 276 and 287, and edge 599 is directed and extends from node 278 to node 276.

As depicted in FIG. 5, a combination of directed and undirected edges can also extend between pairs of nodes of a relationship graph. Using edges 597-599 as examples, edges 597 and 598 may represent one or more interactions or features of an interaction where there was not a clear initiator and/or recipient. Conversely, edge 599 represents one or more interactions or features of an interaction initiated by the individual represented by node 278 and directed toward the individual represented by node 276. The edges of relationship graph 570 are arranged for explanatory purposes and in other examples, other arrangements of undirected and/or directed edges between different arrangements and/or quantities of nodes are possible.

In FIGS. 2,3, and 4, edge weight is depicted by line thickness. Line thickness is only one example of a method of conveying a numeric edge weight value, and in other examples edge weight can be conveyed or denoted in a different manner on a plotted graph. For example, one or more numerals describing the weight of the edge placed adjacent to the edge can be used to convey weight in a plotted graph.

The relationship graphs shown in FIGS. 1-5 are plotted depictions of relationship graphs having drawn nodes and drawn edges connecting the drawn nodes. In examples where graphing module 140 produces a plotted depiction of a baseline relationship graph, simulation module 160 can be configured to generate actions for adjusting a baseline relationship graph using plotted graph depictions of the baseline and target relationship graphs. For example, a plotted graph can be stored as an image to memory 104 and an image hash can be created from the image. For example, the relationship graph created by graphing module 140 can be one or more tables or arrays describing the nodes and edges of the graph. As a specific example, the relationship graph can be a node table describing the nodes of the graph (e.g., by describing the identities or individuals the nodes correspond to) and an edge table describing the edges of the graph (e.g., by describing the feature(s) represented by the edge and the connectivity of the edge). All features represented by the plotted diagrams shown in FIGS. 1-5, such as edge weights or directed/undirected edge information, can be stored in as part of tabular node and edge data. Text and/or numeric data representing a relationship graph can be stored as a table, an array, and/or a database to memory 104 or another suitable storage device, including one or more physical and/or virtual storage devices, for use with simulation module 160. In these examples simulation module 160 can be configured to generate actions for adjusting a baseline relationship graph using graphs represented in tabular, arrayed, and/or database formats.

As will be explained in more detail subsequently, the relationship graphs described herein provide a flexible solution for modeling relationship dynamics within a group of individuals. The relationship graphs described herein can be constructed passively based on video data of members of the group. The use of video data, and in some examples a combination of image, audio, and semantic text data derived from the video data, allows for improved understanding of the quality of interpersonal interactions as compared to existing methods. For example, two individuals in a group may have a large number of sarcastic interactions suggestive of a negative relationship between those two individuals. An existing method may incorrectly assume that based on the volume of interactions, the individuals in fact have a strong relationship. Further, in the case of sarcasm, examining only text data of words spoken by the individuals can cause misinterpretations of the speaker's intent. The methods described herein allow for audio data of sarcastic voice tones from the video data to provide context to the semantic text data. Further, the use of relationship graphs enables representation of individual interactions and/or of the overall connection between each pair of individuals of a group. Existing methods do not provide the granular modeling of relationships and/or connections between individuals of a group provided by the relationship graphs disclosed herein.

Figure 6:
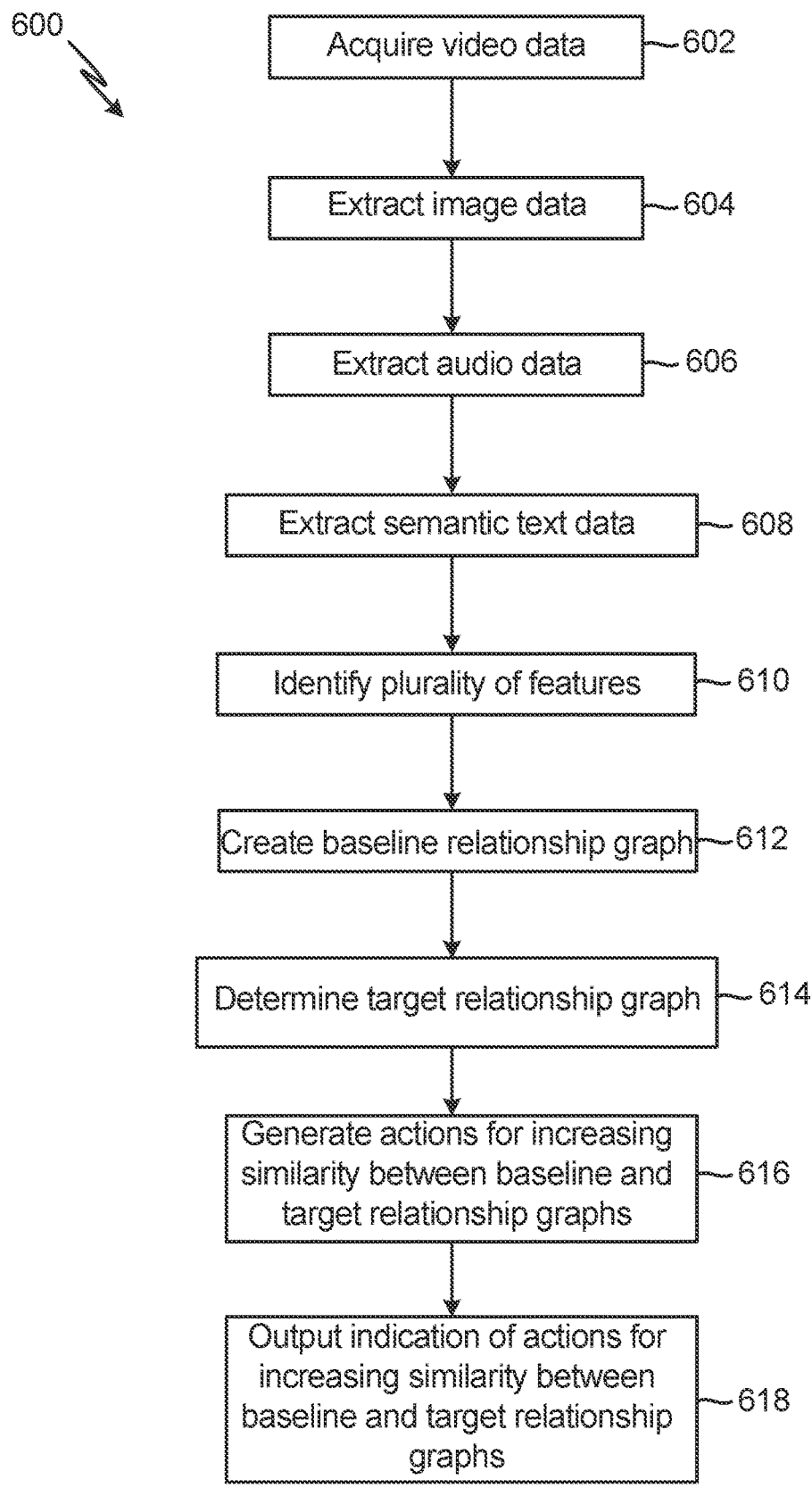
FIG. 6 is a flow diagram of an example of a method of generating actions for adjusting relationships performable by the system of FIG. 1.

FIG. 6 is a flow diagram of method 600, which is a method creating relationship graphs and of generating actions for adjusting relationship graphs. in relationship graphs. Method 600 is performable by relationship adjuster 100 (FIG. 1) and includes steps 602-616 of acquiring video data (step 602), extracting image data (step 604), extracting audio data (step 606), extracting semantic text data (step 608), identifying a plurality of features (step 610), creating a baseline relationship graph (step 612), determining a target relationship graph (step 614), generating actions for increasing similarity between the baseline and target relationship graphs (step 616), and outputting an indication of the actions for increasing the similarity between the baseline and target relationship graphs (step 618). Method 600 can be stored to memory 104 of relationship adjuster 100 and executed by processor 102. For explanatory purposes, method 600 will generally be described herein with reference to relationship adjuster 100. However, method 600 can also be performed by any other suitable device or system.

In step 602, video data is acquired. The video data can be any media source having both audio and image components. The video data can be delivered to relationship adjuster 100 from a video source and/or relationship adjuster 100 can request the video data from the video source. The video source can be any suitable source of video, such as a multimedia file or a video stream. The video data can be of any length, but in some examples, the video data is sampled at pre-determined intervals for use with method 600. Method 600 can be performed for each segment of the video data and updated relationship graph and/or adjustment information can be provided for each segment.

The video data acquired in step 602 is footage of an interacting event and includes footage of all individuals participating in the interacting event. The video data can be acquired by one or more cameras, where each camera captures video of at least one individual. The video data acquired in step 602 can, for example, one or more of video data 110A-N and be taken by a single camera 108A-N or can be taken by multiple cameras 108A-N. Each camera can capture one or more individuals. In some examples, all individuals of participating in the interacting event can be captured by a single camera (e.g., one of cameras 108A-N) and the video data captured by the camera can be used as the video data acquired in step 602. In other examples, all individuals participating in the interacting event can be captured by multiple cameras and the video data captured by those cameras can be compiled and/or aggregated to from the video data acquired in step 602.

In step 604, image data is extracted from the video data acquired in step 602. The image data is stored to memory 104 as a series of still images for use with later steps of method 600. The image data can be extracted from the video data by processor 102 of relationship adjuster 100 (FIG. 1) with one or more programs of video processing module 120. The image data extracted in step 604 includes all individuals participating in the interacting event that were captured by in the image component of the video footage. In some examples, image data for each individual captured in the video data can be separated to create sets of image data for each individual. Features can be identified for each individual in subsequent step 610 by separately analyzing each set of image data. The image data can be separated by, for example, creating a cropped copy of the image data that only includes a single individual. Processor 102 can identify an individual from the still image data and crop each image of the still image data to include only that individual. Cropped image data sets can be created for each individual in the image data and can be separated analyzed for features in subsequent step 610. Additionally and/or alternatively, the image data can be stored as an unseparated file and features can be extracted in subsequent step 610 from the unseparated image data. The still image data can include one image for each frame of the video data or can be sampled at a pre-determined rate. For example, the video data can be sampled once every three frames to generate the still image data.

In step 606, audio data is extracted from the video data. The audio data is extracted by processor 102 of relationship adjuster 100 (FIG. 1) with one or more programs of video processing module 120 and can be stored to memory 104 for use with later steps of method 600. In some examples, the audio data for each individual can be separated to create sets of audio data for each individual captured in the video data. In some examples, processor 102 can execute one or more programs stored on memory 104 to identify which portions of the audio data in which an individual is communicating and trim the audio data to include only those portions. Trimming the audio data can reduce the file size of the audio data, which can reduce the computational requirements to perform steps 610, 612, and/or 614. The program can be, for example, a computer-implemented machine learning model trained to identify individuals based on voices present in audio data.

Processor 102 can use one or more programs stored to memory 104 to determine which portions of the audio correspond to each individual portrayed in the image data. Processor 102 (FIG. 1) can determine which portions of the audio correspond to each individual by, for example, inspecting metadata of the video data acquired in step 602. For example, if each camera 108A-N captures footage of only a single individual 112A-N, processor 102 can associate image and audio data extracted from video data captured by each camera 108A-N. Additionally and/or alternatively, processor 102 can execute one or more programs to identify individuals present in the image data and individuals present in the audio data. The processor 102 can cross-reference a library of individuals to determine which diarized or trimmed audio files and which portions of the image data correspond to each individual, and associate audio and image data for each individual. Additionally and/or alternatively, the processor 102 can execute one or more programs to analyze the image data and determine when each individual is talking. The processor 102 can then use that timestamp information to determine which portions of the audio file correspond to the each individual and thereby associate audio and image data for each individual.

In step 608, the first semantic text data is extracted. As referred to herein, "semantic text data" refers to data that represents spoken words, phrases, sentences, and other sounds produced by the first portrayed individual as readable text. The semantic text data can be, for example, a transcript of the words spoken in the audio portion of the video data. The semantic text data can be extracted from, for example, the audio data extracted in step 606. Processor 102 of relationship adjuster 100 (FIG. 1) can use one or more programs of video processing module 120 to extract the semantic text data. Semantic text data can be extracted from the audio data using a text-to-speech program or another suitable tool and can be associated to the audio and image data for the individual. Separated semantic text data can be extracted from separated audio data for each individual and associated with the appropriate individual. In other examples, the video data can include a semantic text transcript of words, phrases, sentences, etc. spoken by one or all individuals, and first semantic text data can be extracted directly from the video data. In these examples, the semantic text data can be correlated to the correct individual in the group by, for example, comparing timestamp information to the image and audio data, by comparing the semantic text data extracted from the video data to partial semantic text information derived from an extracted audio data set, or by another suitable method.

In step 610, a plurality of features is identified. Processor 102 can identify and extract features from one or more of the image data extracted in step 604, the audio data extracted in step 606, and the semantic text data extracted in step 608. The plurality of features includes classifiable features related to interactions that occurred during the interacting event and can be used to create a relationship graph in subsequent step 612. Processor 102 can inspect and identify features from one or more of the image data, the audio data, and the semantic text data extracted in steps 604, 606, and 608, respectively. The image data, audio data, semantic text data, or any combination thereof can be selected to create the plurality of features in step 610 based on application or operational need and/or based on use in generating relationship graphs that accurately depict interpersonal relationships. For example, if the group participating in the interacting event (i.e., the group of individuals depicted in the video data) is unlikely to be talking, the features identified in step 610 can include only features derived from the image data extracted in step 604. In other examples, features derivable from the audio data, semantic text data, or a combination of image, audio, and/or text data can be omitted from the plurality of features. Once features have been identified from the image data, the audio data, and/or the semantic text data, processor 102 can store the plurality of features to memory 104 for use with subsequent steps of method 600.

In some examples, one or more computer-implemented machine learning models can be used to extract the plurality of features. Each type of data extracted from the video data can be inspected using one or more software tools to identify features that can be stored to the plurality of features. For example, a first computer-implemented machine learning model can be used to analyze image data and identify classifiable features, a second computer-implemented machine learning model can be used to analyze audio data and identify classifiable features, and a third computer-implemented machine learning model can be used to analyze semantic text data and identify classifiable features.

The image data can be analyzed using, for example, a computer vison model or another machine learning model to identify one or more body language elements that can be stored as features of the plurality of features. The body language elements can include, for example, one or more of hand gestures, head tilt, the presence and amount of eye contact, the amount of eye blinking, forehead wrinkling, mouth position, mouth shape, eyebrow shape, and/or eyebrow position. The audio data can be analyzed using, for example, one or more computer-implemented machine learning models to identify features related to information conveyance and/or interpersonal interactions. For example, the features identified from the audio data can be one or more of a vocal tone, a vocal cadence, a vocal pitch, the presence of vocal quavering, intonation, inflection, sentences stress, or another audio element indicative of information conveyance, mood, emotion, or another factor or element relevant to interpersonal communication. The semantic text data can be analyzed using, for example, a natural language understanding model or another machine learning model. The features can be, for example, phonemes, words, phrases, sentences, or other units of language that convey information and are stored in the semantic text data. The features can also be, for example, an intent and/or an entity in the semantic text data. A classifiable intent can include, for example, the intended meaning of a semantic text phrase. A classifiable entity can include, for example, words, phrases, sentences, or other units of language that provide additional context to further describe or classify an intent. In some examples, the model can compare the semantic text transcript of the first portrayed individual to a library of vectorized text data to determine the content of the semantic text data.

Each of the features extracted in step 610 is associated with one or more individuals of the individuals captured in the video data acquired in step 610. Associating the features extracted in step 610 allows for edges representative of those features to be associated with nodes representative of individuals captured in the video data, as will be explained in more detail with respect to subsequent step 612. Processor 102 can use one or more programs of feature extraction module 130 and/or graphing module 140, and/or one or more other programs stored to memory 104 to assign identities to individuals captured in the video data and to associate features with those identities. The identity information for each feature can be stored to memory 104 for use with subsequent steps of method 600.

In some examples, a feature may be directed such that it describes an interaction having a discernable initiator and/or recipient. Feature extraction module 130 can include one or more programs that allow for identification of whether a feature describes an interaction having an initiator and/or recipient and, in some examples, for identifying the initiator and/or recipient. Whether a feature has an initiator and/or recipient and the identities of the initiator and/or recipient can be stored to memory 104 for use with subsequent steps of method 600.

In step 612, a baseline relationship graph is created. Processor 102 can use one or more programs of graphing module 140 to create the baseline relationship graph. The baseline relationship graph includes nodes representative of the individuals captured in the video data acquired in step 602 and baseline edges representative of the features extracted in step 610 extending between those nodes. Accordingly, the baseline relationship graph describes a baseline state of the relationships among the individuals captured in the video data at the time the video data was captured and before modification according to the programs of relationship adjuster 100. The number and identity of the nodes can be determined based on the identity information generated for the individuals captured in the video data. The connectivity and, in applicable examples, orientations of edges can be determined based on the identities associated with each feature extracted by feature extraction module 130. In examples where the relationship graph is a weighted graph, edge weights can be assigned by one or more programs of graphing module 140 or another program stored to memory 104. For example, features extracted by feature extraction module 130 can be cross-referenced with a table, array, or database that relates features and edge weights, and the cross-referenced edge weights can be used as weights for the edges representative of those features in the relationship graph. Additionally and/or alternatively, edge weight can be determined using a computer-implemented machine learning model trained accept a feature identity as an input and to output an edge weight. In some examples, two or more edges between two nodes can be combined. For example, all edges between nodes can be combined into a single edge representative of the relationship between the two individuals represented by the nodes. As a further example, all edges of a particular category (e.g., all edges representative of body language-related features) can be combined into a single edge representative of that category. In these examples, the weights of the constituent edges can be combined, such as by summation, into a single value representative of the combined edge. Combining edges of the relationship graph can allow the edges to be representative of an overall connection between individuals of the group. In some examples, it may be advantageous for certain individuals to have little or no connection, and the presence of any edge between the nodes representing those individuals can be identified quickly in subsequent step 614 where the edges of the relationship graph have been combined in this manner. In further examples, the relationship graph can be plotted and a plotted depiction of the relationship graph can be stored as an image to memory 104.

In step 614, a target relationship graph is determined. The target relationship graph describes ideal relationships between the individuals of the group depicted in the video data acquired in step 602. The target relationship graph can be identified from a pre-existing set of potential target relationship graphs or the target relationship graph can be newly generated for the group based on properties of the group and/or properties of the interacting event depicted in the video data acquired in step 602. For example, processor 102 can receive inputs describing the individuals and/or the interacting event, such as the identities of the individuals, the positions of the individuals, a task performed during the interacting event, and/or another descriptor of the interacting event (e.g., a category of interacting event to which the depicted event belongs). Processor 102 can cross-reference a table or query a database that relates target relationship graphs to properties of individuals and/or properties of interacting events to identify the target relationship graph for the group of individuals depicted in the video data. Additionally and/or alternatively, processor 102 can use descriptions of the individuals and/or the interacting event as inputs for one or more computer programs configured to generate a new target relationship graph for the individuals portrayed in the video data acquired in step 602. The one or more computer programs can be, for example, one or more computer-implemented machine learning models.

The target relationship graph determined in step 614 contains the same number of nodes as the baseline graph created in step 612, and the nodes of the baseline relationship graph created in step 612 and the target relationship graph determined in step 614 represent the same individuals. However, the target relationship graph includes a set of target edges rather than the baseline edges of the baseline relationship graph. There may be different quantities of target and baseline edges, the baseline and target edges may have different weights, and/or the baseline and target edges may be arranged differently, such that the baseline and target relationship graphs describe different states of relationships between the same individuals. Advantageously, this allows a simulator, such as a simulator of simulation module 160 (FIG. 1), to simulate changes to the baseline edges of the baseline relationship graph to increase similarity between the number and/or arrangement of edges between the baseline and target relationship graphs. Further, this allows the actions created in step 616, described subsequently, to adjust relationships between individuals of a single group of individuals without requiring individuals to be added to or removed from the group to adjust the relationships of the group.

In step 616, actions for increasing similarity between the baseline and target relationship graphs are generated. The actions that increase similarity are chosen from a predetermined group of actions for adjusting group relationships. Step 616 is performed by iteratively simulating the effect of actions of the predetermined group on the baseline relationship graph created in step 612. The simulator uses a program for determining the change the baseline edges of the baseline relationship graph associated with each action of the plurality of actions, such as a computer-implemented machine learning model trained to predict changes to relationship graphs based on performance of actions of the group of actions. As the target relationship graph describes a target set of relationships between the individuals of the group and the baseline relationship graph describes a baseline set of relationships, the actions simulated in step 616 for changing the baseline edges of the baseline relationship graph to resemble the target edges of the target relationship graph are also associated with causing the baseline relationships of the group to resemble the target relationships described by the target relationship graph.

The simulator performs simulations by simulating the effect of each action on the group of actions on the baseline relationship graph and storing the action that produces an adjusted relationship graph having the highest similarity to the target relationship graph. The simulator can use one or more programs to compare the similarity of relationship graphs (e.g., one or more machine learning models trained to determine the similarity of relationship graphs) to select an action of the plurality of actions as producing the graph having the highest similarity to the target relationship graph. The adjusted relationship graph is stored to a memory as an intermediate graph (i.e., intermediate to the baseline and target relationship graphs) and used as a starting relationship graph for a further round of simulation. The simulation process can be repeated until the intermediate relationship graph produced by the most recent round of simulation is within a threshold degree of similarity to the target relationship graph.

The actions selected and stored during the simulation process, when performed in sequence, are predicted to increase similarity between the baseline relationship graph and the target relationship graph. Advantageously, when performed before a subsequent interacting event, the actions are also predictive of causing the relationship graph of the subsequent interacting event to more closely resemble the target relationship graph. The action(s) selected during the course of the simulation can be stored to a memory, such as memory 104, for further use with method 600. Similarly, the intermediate relationship graphs created during the simulation process can also be stored to a memory, such as memory 104, for further use with method 600.

In some examples, the baseline relationship graph generated in step 612 and the target relationship graph identified in step 614 can be converted to image hashes prior to action simulation by simulation module 160. In these examples, simulation module 160 can include one or more programs for creating images of the baseline and target relationship graphs, for creating image hashes of the of the baseline and target relationship graph images, and for performing simulations using image hash data. In other examples, simulation module 160 can be configured to perform simulations based on relationship data stored as a table, array, and/or database. In these examples, simulation module 160 can include one or more programs for storing relationship graph information as a table, array, and/or database.

In step 618, an indication of the actions for increasing similarity between the baseline and target relationship graphs is output. The indication includes one or more alphanumeric characters that describe the actions with sufficient detail that a member of the group or an individual who regularly interacts with the group can perform the actions. For example, an individual of the group can perform an action based on the indication output in step 618 to increase the likelihood that the relationship graph of a subsequent interacting event of the group is more similar to the target relationship graph than the baseline relationship graph used to generate the actions represented by the indication. Additionally and/or alternatively, another individual that is not a part of the group (e.g., a manager of the group that did not participate in the interacting event) who is interacting with the group or who is capable of interacting with the group can perform the actions to adjust relationships among the group members to increase the likelihood that the relationship graph of a subsequent interacting event of the group is more similar to the target relationship graph than the baseline relationship graph. As used herein, an "interacting individual" refers to an individual not depicted in the video data acquired in step 602 that is interacting with or who is otherwise capable of interacting with members of the group depicted in the video data. The indication output in step 618 can also include an indication describing whether an interacting individual or a member of the group should perform the action(s) generated in step 616.

Processor 102 can create the indication by, for example cross-referencing a table or querying a database that relates actions of the set of actions used during step 616 to indications of those actions, or by using another program configured to relate indications of actions with actions created during step 616. The indications can be, for example, descriptions of the actions that can be used by an individual to determine what actions should be performed to adjust the relationships of the group. The indications can also be, for example, one or more instructions for performing the actions. The indication created in step 102 can be output to a user interface, such as user interface 106, for use in adjusting the relationships of the group.

In some examples, the intermediate relationship graphs can also be output. Advantageously, outputting the intermediate relationship graphs can provide context to the actions indicated by the indication output in step 618. For example, the intermediate relationship graphs can be plotted and stored as image files, and the image file of each intermediate graph can be displayed with text or another indication describing the action used to create that intermediate graph during the simulation process in step 616. Providing visual context to the improvements in group relationships provided by the indication output in step 618 can significantly improve the ability of individuals performing the actions to understand the effect(s) of the actions on relationships within the group.

Figure 7:
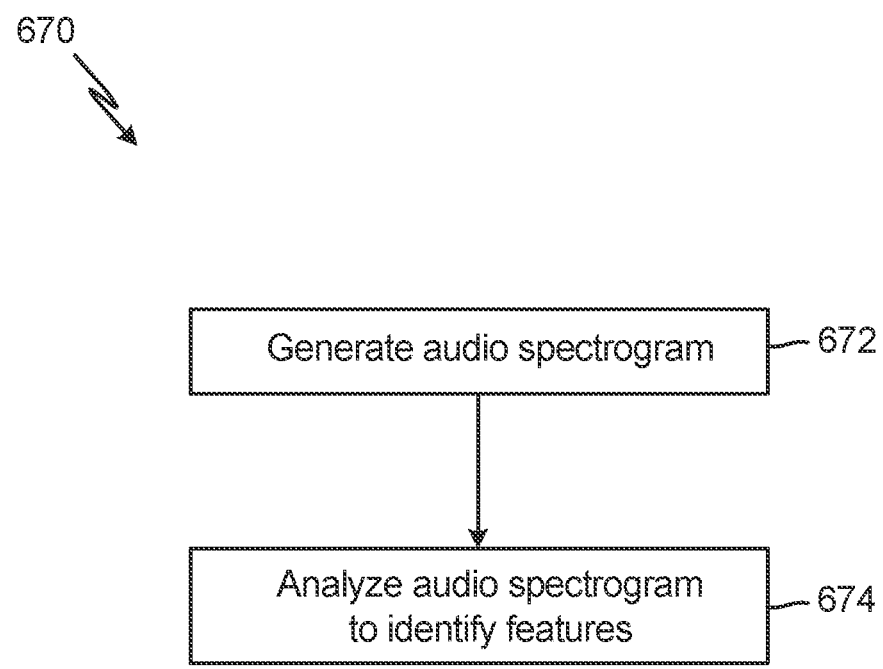
FIG. 7 is a flow diagram of an example of a method of analyzing audio data suitable for use with the method of FIG. 6.

In some examples, the audio data extracted in step 602 can be converted to an audio spectrogram and that can be analyzed in step 610 to identify the plurality of features. FIG. 7 is a flow diagram of method 650, which is a method of analyzing audio data that can be performed during steps 604 and/or 610 of method 600. Method 600 includes steps 652-654 of generating an audio spectrogram (step 652) and analyzing the audio spectrogram to identify features (step 654).

In step 652, the audio data extracted in step 606 is converted to a spectrogram. The spectrogram can describe, for example, the amplitude or frequency ranges of the audio data. In step 654, features present in the audio spectrogram are identified. The features identified in step 654 are features related to information conveyance and/or interpersonal interactions, as described previously with respect to step 610 of method 600 (FIG. 6). In some examples, processing the audio data as an audio spectrogram reduces the computational load required for a processor and/or control circuitry (e.g., processor 102 of relationship adjuster 100) to identify features in the audio data.

Method 600 provides a number of advantages that improve the ease with which relationships among members of a group can be adjusted. Method 600 allows for the automatic output of actions that can be used by members of the group or an individual interacting with the group to improve the relationships among the group members. Advantageously, improvements to relationship quality can provide a wide range of benefits in a wide range of applications. For example, improving relationship quality among members of a work team can advantageously provide concomitant improvements to productivity and work quality. Strong relationships can be associated with, for example, high willingness to collaborate and communicate, which can be associated improve productivity and output from the group. As a further example, improving relationship quality between a sales team and a potential buyer can improve the likelihood of a successful sale. These examples are non-limiting and are included to illustrate the manner in which the actions created using method 600 can improve event outcomes by improving relationship strength of individuals participating in the event.

Further, method 600 allows for actions to be created in an automated manner that does not require subjective human judgment to improve relationships. As method 600 only requires video data of the group interacting, method 600 also allows a wider range of individuals to improve relationship dynamics among a group. For example, there may be a suboptimal relationship between a subset of group members that is not easily perceived by members outside of the subset. Method 600 advantageously does not require any individuals to understand and study the relationships of other members of a group to improve relationship score. Rather, relationship adjuster 100 or another suitable system can perform method 600 in an automated manner.

As described previously, method 600 adjusts the relationships between a non-varying group of individuals. It is often impractical or unsuitable to adjust the relationships of a group by adding, replacing, and/or removing individuals from the group to change or improve group dynamics. Accordingly, method 600 advantageously allows for relationships to be adjusted among members of a group in these examples without requiring substitution, removal, and/or addition of group members.

Figure 8:
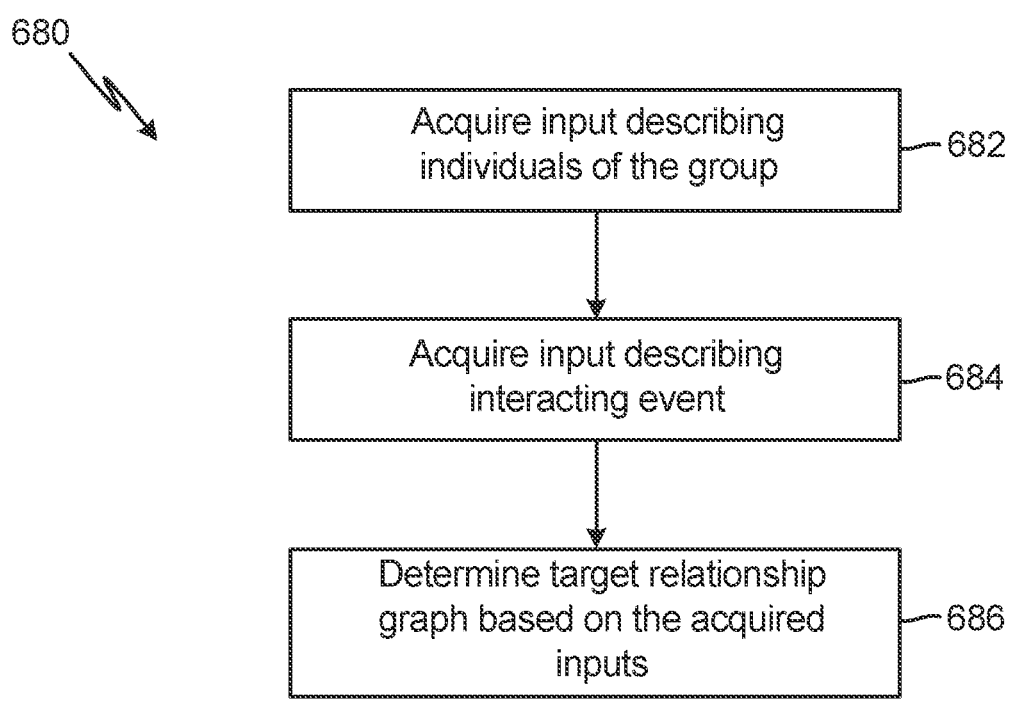
FIG. 8 is a method of generating a target relationship graph suitable for use with the method of FIG. 6.

FIG. 8 is a flow diagram of method 680, which is a method of determining a target relationship graph. Method 680 includes steps of acquiring an input describing individuals of the group (step 682), acquiring an input describing the interacting event (step 684), and determining a target relationship graph based on the acquired inputs (step 686). Method 680 can be performed during step 614 of method 600 (FIG. 6) to determine a target relationship graph.

In step 682, an input describing individuals of the group portrayed in the video data acquired in step 602 (FIG. 6) is acquired. The input can be acquired by processor 102 from an input provided by a user at user interface 106. Additionally and/or alternatively, the input can be automatically generated by relationship adjuster 100 based on the video data. For example, one or more programs can be configured to generate information describing members of the group based on the video data. The input acquired in step 682 can describe identities of the individuals, known relationships among group members, and/or positions of individuals within an organization and/or within the group. For example, the input acquired in step 682 can describe which members of the group are managers, which members are leads, and/or which members are otherwise responsible for directing the group, among other options.

In step 684, an input describing the interacting event is acquired. The input can be acquired by processor 102 from an input provided by a user at user interface 106. Additionally and/or alternatively, the input can be automatically generated by relationship adjuster 100 based on the video data. For example, one or more programs can be configured to generate information describing the interacting event based on the video data. The input can describe a task performed during the interacting event and/or a category of interacting event to which the event portrayed in the video data belongs. For example, the input can describe that the interacting event is a meeting, a lecture, or a sales pitch, among other options.

In step 686, a target relationship graph is determined based on the inputs acquired in steps 682 and 684. Processor 102 can cross-reference a table or query a database that relates target relationship graphs to the inputs acquired in steps 682 and/or 684 to identify the target relationship graph for the group of individuals depicted in the video data. Additionally and/or alternatively, processor 102 can use the inputs acquired in steps 682 and/or 684 as inputs for one or more computer programs configured to generate a new target relationship graph for the individuals portrayed in the video data acquired in step 602. The one or more computer programs can be, for example, one or more computer-implemented machine learning models.

Figure 9:
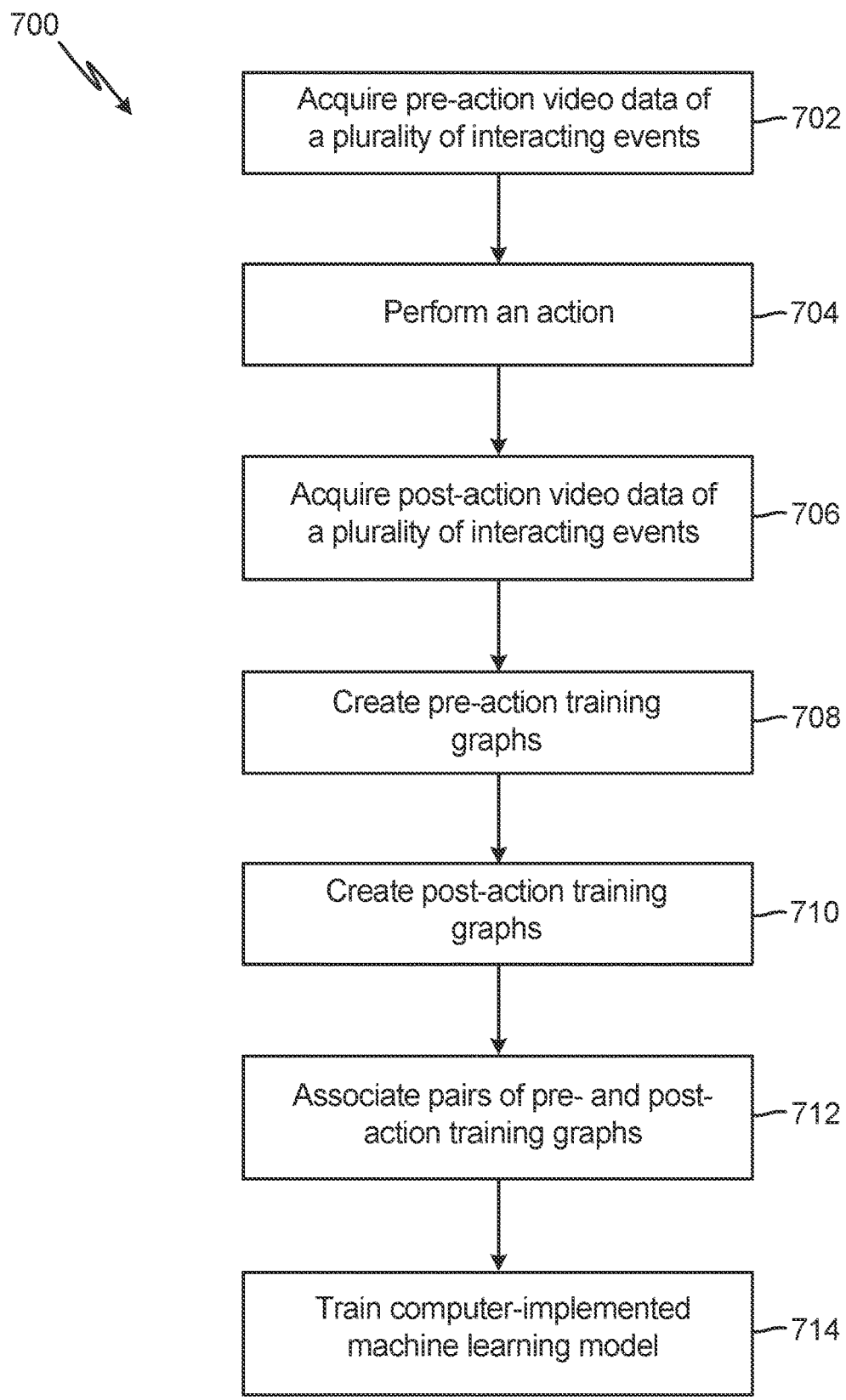
FIG. 9 is an example of a method of training a computer-implemented machine learning model to associate actions with changes to relationship graphs.

FIG. 9 is an example of a method 700, which is a method of training a computer-implemented machine learning model to associate actions with changes to relationship graphs. Method 700 includes steps 702-714 of acquiring pre-action video data of a plurality of interacting events (step 702), performing an action (step 704), acquiring post-action video data of a plurality of interacting events (step 706), creating pre-action training graphs (step 708), creating post-action training graphs (step 710), associating pairs and pre- and post-action training graphs (step 712), and training a computer-implemented machine learning model (step 714). The computer-implemented machine learning model trained in step 714 can be used by the simulator in step 616 of method 600 (FIG. 6) to determine changes to the baseline relationship graph associated with each action of the plurality of actions.

In step 702, pre-action video data of a plurality of interacting events is acquired. Each interacting event of the plurality of interacting event includes a plurality of interactions between a group of individuals, such that the video data portrays a plurality of interacting events of a plurality of groups. The interacting events can be of the same type or the same task can be performed in the interacting events. Advantageously, this can improve the accuracy of predictions made with the machine learning model following step 714. In other examples, the events can be of different types and/or include different tasks, which can increase the range of potential events to which the trained model can be applied following step 714. The video data is acquired prior to the performance of the action in step 704.

In step 704, an action is performed. For each interacting event, the action can be performed by a member of the group or an individual interacting with the group. The action is an action of the set of actions used in step 616 of method 600 (FIG. 6). Performance of the action does not have to be captured by video data. Rather, it is only necessary to acquire video data depicting the groups before performance of the action (i.e., video data acquired in step 702) and video data depicting the same groups after performance of the action (i.e., video data acquired in step 704).

In step 706, post-action video data of a new plurality of interacting events is acquired. The post-action video data portrays the same groups of individuals as the pre-action video data, but potentially includes different interactions. Differences between interactions in the pre-action and post-action video data can be attributed, at least in part, to the performance of the action in step 604. Accordingly, relationship graph information derived from the pre-action and post-action video data can be used to train a computer-implemented machine learning model to predict the effect of the action on relationship graphs.

In step 708, pre-action training graphs are created for each interacting event portrayed in the pre-action video data. In step 710, post-action training graphs are created for each interacting event portrayed in the post-action video data. Steps 708 and 710 are performed according to steps 604-612 of method 600 (FIG. 6) and create pairs of relationship graphs for each group of individuals. The relationship graphs created in steps 708 and 710 can be labeled and/or sorted according to each group of individuals. The relationship graphs created in step 708 can be labeled according as pre-action graphs and the relationship graphs created in step 710 can be labeled as post-action graphs. In step 712, pairs of pre- and post-action training graphs for each group are associated. The graphs can be associated according to, for example, metadata or another label describing the group depicted in the relationship graphs.

In step 714, a computer-implemented machine learning model is trained using the associated pairs of relationship graphs. The computer-implemented machine learning model can be any appropriate model for predicting changes to relationship graphs based on performance of the action performed in step 704. For each group, the relationship graph created in step 708 depicts the status of relationships before the action was performed and the relationship graph created in step 710 depicts the status of relationships after the action was performed. As the same individuals are depicted in the pre- and post-action relationship graphs for each group, the pre- and post-action training graphs for each group have the same number of nodes. Differences in edges between the pre- and post-action training graphs can be attributed, at least in part, to the performance of the action, and training the machine learning model in step 714 allows the machine learning model to predict changes to relationship graphs not included in the training set (i.e., the graphs created in steps 708 and 710).

Method 700 can be repeated for all actions of the set of actions desired for use during simulation in step 616 of method 600 (FIG. 6). Different machine learning models can be used to simulate changes in relationship graphs for each action or, alternatively, the same machine learning model can be trained to predict changes for all actions used to simulate changes to relationship graphs in method 600 (FIG. 6). The machine learning models trained using method 700 advantageously can recognize patterns in changes to relationship graphs associated with each action that are not recognizable or easily discoverable to human operators configuring simulation module 160 or other components of relationship adjuster 100 (FIG. 1).

Figure 10:
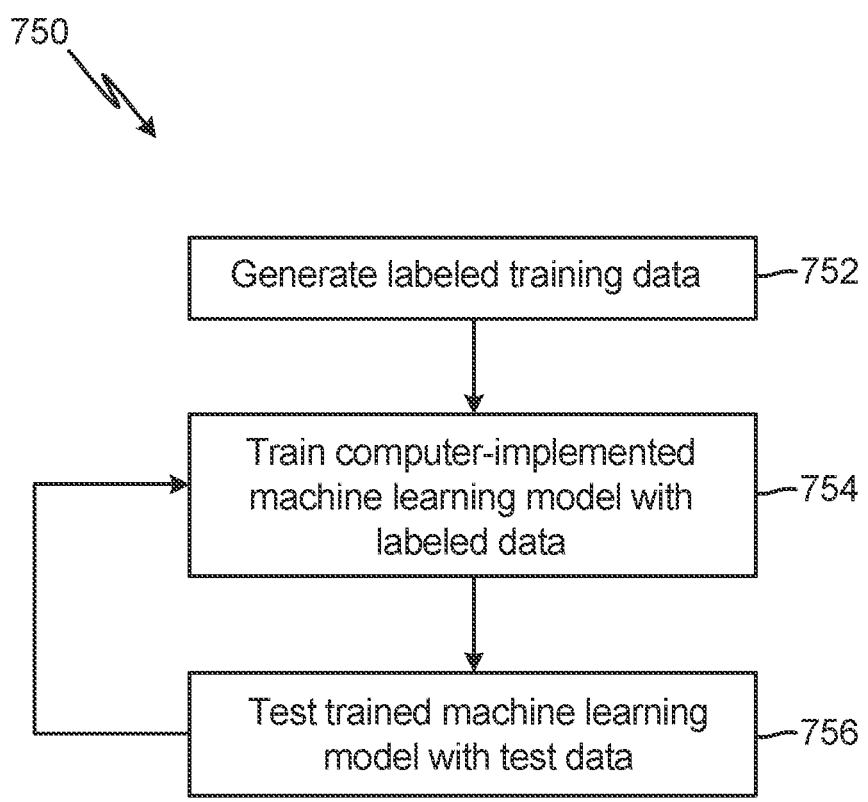
FIG. 10 is a flow diagram of an example of a method of training a computer-implemented machine learning model.

FIG. 10 is a flow diagram of method 750, which is a method of supervised training of a computer-implemented machine learning model for use with other methods of this disclosure. Method 750 includes steps 752-756 of generating labeled training data (step 752), training the computer-implemented machine learning model with the labeled data (step 754), and testing the trained computer-implemented machine learning model with test data (step 756). Method 750 can be used to train any machine learning model described herein (e.g., for a machine learning model for identifying and extracting features, for a machine learning model for creating relationship graphs, for a machine learning model for predicting changes to relationship graphs based on performance of an action, etc.) but will be discussed with respect to a generic machine learning model for explanatory purposes.

In step 752, labeled data is generated. The labeled data can be generated by tagging a data with one or more labels describing the data. For example, where the labeled data is a set of relationship graphs, each relationship graph can be tagged with a label describing the outcome of the interacting event described by the relationship graph. The labeled data can be, for example, labeled video data. The labeled data can also be, for example, audio data, image data, semantic text data, or labeled outputs of another trained machine learning model. The labeled data can be one or more features used to create a relationship graph via, for example, method 600. The labeled data can also be, for example, one or more relationship graphs, such as the relationship graphs created in steps 708 and 710 of method 700.

In step 754, the labeled data is used to train the computer-implemented machine learning model. As used herein, "training" a computer-implemented machine learning model refers to any process by which parameters, hyper parameters, weights, and/or any other value related model accuracy are adjusted to improve the fit of the computer-implemented machine learning model to the training data. The labeled data can be transformed by, for example, one or more programs and/or one or more other trained machine learning models before it is used for training in step 754.

In step 756, the trained computer-implemented machine learning model is tested with test data. The test data used in step 756 is unlabeled data that is used to qualify and/or quantify performance of the trained computer-implemented machine learning model. More specifically, a human or machine operator can evaluate the performance of the machine learning model by evaluating the fit of the model to the test data. Step 756 can be used to determine, for example, whether the machine learning model was overfit to the labeled data during model training in step 754.

As depicted in FIG. 11, steps 754 and 756 can be performed iteratively to improve the performance of the machine learning model. More specifically, if the fit of the model to the unlabeled data determined in step 756 is undesirable, step 754 can be repeated to further adjust the parameters, hyper parameters, weights, etc. of the model to improve the fit of the model to the test data. Step 756 can then be repeated with a new set of unlabeled test data to determine how the adjusted model fits the new set of unlabeled test data. If the fit continues to be undesirable, further iterations of steps 754 and 756 can be performed until the fit of the model becomes desirable.

As described previously, the methods and systems disclosed herein provide significant advantages for improving relationships among a group to improve outcomes of events in which the group participates. Advantageously, the methods and systems described herein allow for performable actions capable of improving group relationships to be generated based only on video data and can be performed in an automated manner by one or more computer systems (e.g., relationship adjuster 100), thereby providing a more objective method of improving interpersonal relationships than conventional methods that rely on subjective judgment. Notably, as the methods and systems for improving relationships disclosed herein can be performed in an automated manner, the methods and systems disclosed herein also reduce the expertise in social interactions required to remedy strained interpersonal relationships.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:
1. A method comprising:
  acquiring digital video data that portrays an interacting event of a plurality of individuals, the interacting event comprising a plurality of baseline interactions between a plurality of individuals;
  analyzing, by a first computer-implemented machine learning model, the video data to identify a plurality of features, wherein:
    each feature of the plurality of features corresponds to a baseline interaction of the plurality of baseline interactions; and each feature of the plurality of features is associated with at least one individual of the plurality of individuals;
analyzing the plurality of features to create a baseline relationship graph, wherein:
the baseline relationship graph comprises a plurality of nodes and a plurality of baseline edges;
each node of the plurality of nodes represents an individual of the plurality of individuals;
each edge of the plurality of baseline edges extends between two nodes of the plurality of nodes; and
the plurality of baseline edges represents the plurality of baseline interactions;
determining a target relationship graph comprising the plurality of nodes and a plurality of target edges, wherein:
each edge of the plurality of target edges extends between two nodes of the plurality of nodes; and
the plurality of target edges represents a plurality of target interactions;
generating one or more actions for increasing similarity between the baseline relationship graph and the target relationship graph using a simulator, a second computer-implemented machine learning model, and a plurality of actions, wherein:
the second computer-implemented machine learning model is configured to relate actions of the plurality of actions to changes to relationship graphs;
the simulator is configured to simulate changes to the baseline relationship graph using the second computer-implemented machine learning model and the plurality of actions;
the one or more actions are performable by individuals of the plurality of individuals; and
the one or more actions for increasing similarity between the baseline relationship graph and the target relationship graph increase similarity between the plurality of baseline edges and the plurality of target edges; and
outputting, by a user interface, an indication of the one or more actions.

2. The method of claim 1, wherein the one or more actions are selected to, when performed, cause interactions of the plurality of target interactions that are not present in the plurality of baseline interactions.

3. The method of claim 2, wherein the one or more actions are selected to, when performed, prevent interactions of the plurality of baseline interactions that are not present in the plurality of target interactions.

4. The method of claim 3, and further comprising:
acquiring first training video data that portrays a first plurality of training events, wherein each training event of the first plurality of training events comprises a plurality of first training interactions between a plurality of individuals, such that the first plurality of training events comprises a first plurality of pluralities of training events between a plurality of pluralities of individuals;
performing, by an individual of each plurality of individuals, an action of the plurality of actions after acquiring the first training video data;
acquiring second training video data that portrays a second plurality of training events after performing the action of the plurality of actions, wherein each training event of the second plurality of training events comprises a plurality of second training interactions between a plurality of individuals of the plurality of pluralities of individuals, such that the second plurality of training events comprises a second plurality of pluralities of training events between the plurality of pluralities of individuals;
creating a first set of training graphs based on the first training video data;
creating a second set of training graphs based on the second training video data;
associated training graphs of the first set of training graphs and second set of training graphs for each plurality of individuals of the plurality of pluralities of individuals to create associated pairs of training graphs; and
training the second computer-implemented machine learning model with the associated pairs of training graphs to predict changes to relationship graphs caused by the action of the plurality of actions.

5. The method of claim 3, wherein outputting the indication of the one or more actions comprises outputting instructions for performing the one or more actions.

6. The method of claim 5, wherein:
the one or more actions are performable by an interacting individual interacting with the plurality of individuals; and
outputting the instructions for performing the one or more actions comprises outputting the instructions to an interacting individual interacting with the plurality of individuals.

7. The method of claim 5, wherein outputting the instructions for performing the one or more actions comprises outputting the instructions to an individual of the plurality of individuals.

8. The method of claim 7, wherein determining the target relationship graph comprises:
acquiring a first input describing the plurality of individuals; and
determining the target relationship graph based on the first input.

9. The method of claim 8, wherein determining the target relationship graph comprises:
acquiring a second input describing the interacting event; and
determining the target relationship graph based on the second input.

10. The method of claim 9, wherein determining the target relationship graph comprises querying a database that relates descriptions of pluralities of individuals, descriptions of interacting events, and target relationship graphs with the first input and the second input.

11. The method of claim 10, wherein analyzing, by the first computer-implemented machine learning model, the video data to identify the plurality of features comprises:
extracting image data from the video data;
extracting audio data from the video data;
extracting semantic text data from the video data; and
analyzing, by the first computer-implemented machine learning model, at least one of the image data, audio data, and semantic text data to identify the plurality of features.

12. The method of claim 11, wherein analyzing, by the first computer-implemented machine learning model, at least one of the image data, audio data, and semantic text to identify the plurality of features comprises:
analyzing the image data with the first computer-implemented machine learning model;
analyzing the audio data with a third computer-implemented machine learning model; and analyzing the semantic text data with a fourth computer-implemented machine learning model.

13. The method of claim 12, and further comprising, before generating the one or more actions:
converting the baseline relationship graph to baseline tabulated data before generating the one or more actions; and
converting the target relationship graph to target tabulated data before generating the one or more actions;
wherein:
the second computer-implemented machine learning model is configured to relate actions of the plurality of actions to changes to the tabulated baseline data;
the simulator is configured to simulate changes to the baseline tabulated data using the second computer-implemented machine learning model and the plurality of actions; and
the one or more actions increase similarity between the baseline tabulated data and the target tabulated data.

14. A system comprising:
a camera device for acquiring digital video data;
a processor;
a user interface; and
a memory encoded with instructions that, when executed, cause the processor to:
acquire digital video data from the camera, wherein the digital video data portrays an interacting event comprising a plurality of baseline interactions between a plurality of individuals;
analyze, by a first computer-implemented machine learning model, the video data to identify a plurality of features in the digital video data;
analyze the plurality of features to create a baseline relationship graph, wherein:
the baseline relationship graph comprises a plurality of nodes and a plurality of baseline edges;
each node of the plurality of nodes represents an individual of the plurality of individuals;
each edge of the plurality of baseline edges extends between two nodes of the plurality of nodes; and
the plurality of baseline edges represents the plurality of baseline interactions;
determine a target relationship graph comprising the plurality of nodes and a plurality of target edges, wherein:
each edge of the plurality of target edges extends between two nodes of the plurality of nodes; and
the plurality of target edges represents a plurality of target interactions;
generate one or more actions for increasing similarity between the baseline relationship graph and the target relationship graph using a simulator, a second computer-implemented machine learning model, and a plurality of actions, wherein:
the second computer-implemented machine learning model is configured to relate actions of the plurality of actions to changes to relationship graphs;
the simulator is configured to simulate changes to the baseline relationship graph using the second computer-implemented machine learning model and the plurality of actions;
the one or more actions are performable by individuals of the plurality of individuals; and
the one or more actions for increasing similarity between the baseline relationship graph and the target relationship graph increase similarity between the plurality of baseline edges and the plurality of target edges; and
cause the user interface to output an indication of the one or more actions.

15. The system of claim 14, wherein the one or more actions are selected to, when performed, cause interactions of the plurality of target interactions that are not present in the plurality of baseline interactions.

16. The system of claim 15, wherein the instructions, when executed, cause the processor to:
acquire a first input describing the plurality of individuals;
acquire a second input describing the interacting event; and
query a database to determine the target relationship graph, wherein the database relates descriptions of pluralities of individuals, descriptions of interacting events, and target relationship graphs with the first input and the second input.

17. The method of claim 16, wherein the indication of the one or more actions comprises instructions for performing the one or more actions.

* * * * *